United States Patent [19]

Nakazawa et al.

[11] Patent Number: 5,451,724
[45] Date of Patent: Sep. 19, 1995

[54] TOUCH PANEL FOR DETECTING A COORDINATE OF AN ARBITRARY POSITION WHERE PRESSURE IS APPLIED

[75] Inventors: Fumihiko Nakazawa; Masao Shibayama; Tatsumi Ohtsuka; Katsuya Irie; Kimikazu Itoh; Mituyoshi Seino; Toshiaki Tanaka; Akihiko Sakaguchi; Genichi Matsuda, all of Kawasaki, Japan

[73] Assignee: Fujitsu Limited, Kanagawa, Japan

[21] Appl. No.: 99,652

[22] Filed: Jul. 30, 1993

[30] Foreign Application Priority Data

Aug. 5, 1992 [JP] Japan .................. 4-209148
Oct. 23, 1992 [JP] Japan .................. 4-286101
Jul. 22, 1993 [JP] Japan .................. 5-181652

[51] Int. Cl.$^6$ .................. G08C 21/00; G09G 3/02
[52] U.S. Cl. .................. 178/20; 178/18; 178/19; 345/173; 345/179
[58] Field of Search .................. 178/18, 19, 20; 345/173, 179

[56] References Cited

U.S. PATENT DOCUMENTS

| | | | |
|---|---|---|---|
| 3,911,215 | 10/1975 | Hurst et al. | 178/18 |
| 4,164,622 | 8/1979 | Pobgee | 178/18 |
| 4,568,798 | 2/1986 | Ambros et al. | 178/20 |
| 4,680,430 | 7/1987 | Yoshikawa et al. | 178/19 |
| 4,733,023 | 3/1988 | Tamaru | 178/20 |
| 4,752,655 | 6/1988 | Tajiri | 178/18 |
| 4,798,919 | 1/1989 | Miessler | 178/18 |
| 4,929,934 | 5/1990 | Veda | 178/19 |
| 5,008,497 | 9/1991 | Asher | 178/18 |
| 5,070,217 | 12/1991 | Kobayashi | 178/19 |
| 5,181,030 | 1/1993 | Itaya | 178/18 |
| 5,220,136 | 6/1993 | Kent | 178/18 |

FOREIGN PATENT DOCUMENTS

| | | |
|---|---|---|
| 56-11582 | 2/1981 | Japan . |
| 58-35679 | 3/1983 | Japan . |
| 60-181913 | 9/1985 | Japan . |
| 63-46531 | 2/1988 | Japan . |
| 4-141719 | 5/1992 | Japan . |

*Primary Examiner*—Stephen Chin
*Assistant Examiner*—V. Shankar
*Attorney, Agent, or Firm*—Staas & Halsey

[57] ABSTRACT

A touch panel to detect a coordinate of an arbitrary position where pressure is applied. The touch panel includes a substrate, a resistor layer provided on the substrate, a spacer layer made of an insulator material, a conductor layer confronting the resistor layer via the spacer layer, a plurality of point electrodes provided on the resistor layer at a peripheral part of the resistor layer along each side of the resistor layer, and a plurality of switching elements provided above the substrate and electrically coupled to the point electrodes for supplying a voltage to the point electrodes. The spacer layer is made up of a plurality of spacer pieces which are arranged so that an electrical contact is made between the conductor layer and the resistor layer when a pressure is applied at an arbitrary position on the conductor layer.

53 Claims, 27 Drawing Sheets

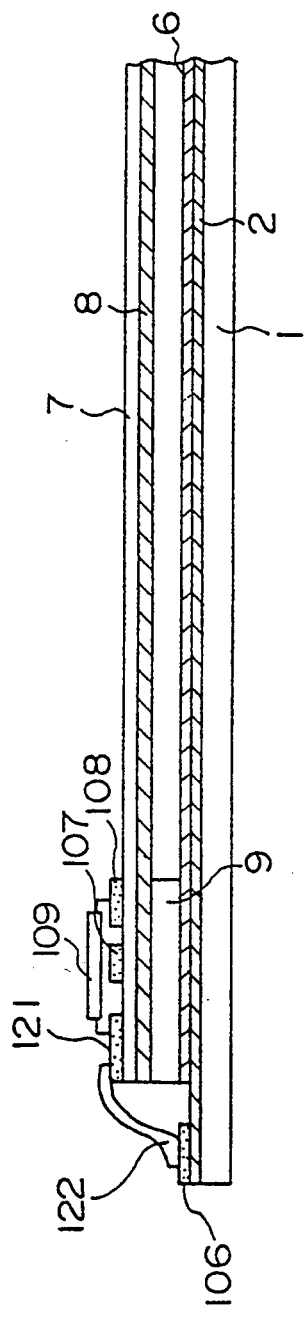
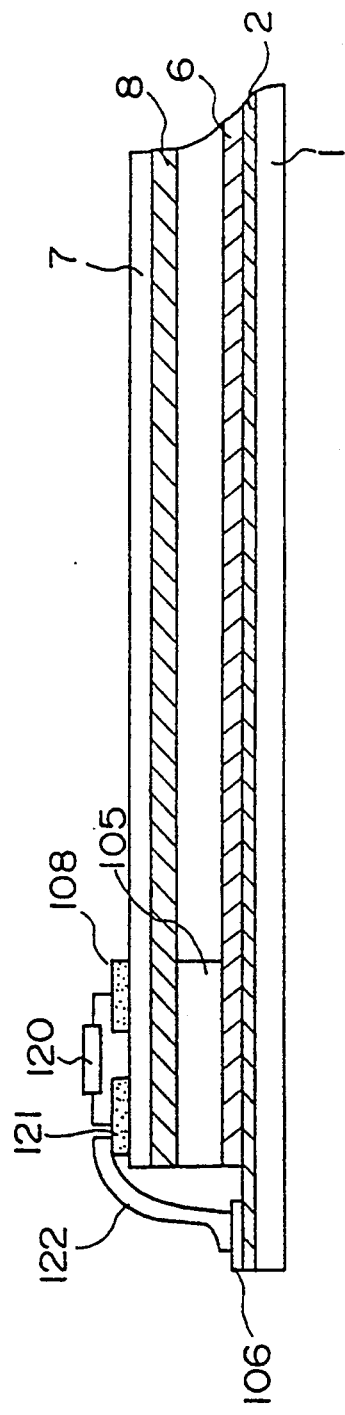
FIG. 12
FIG. 13

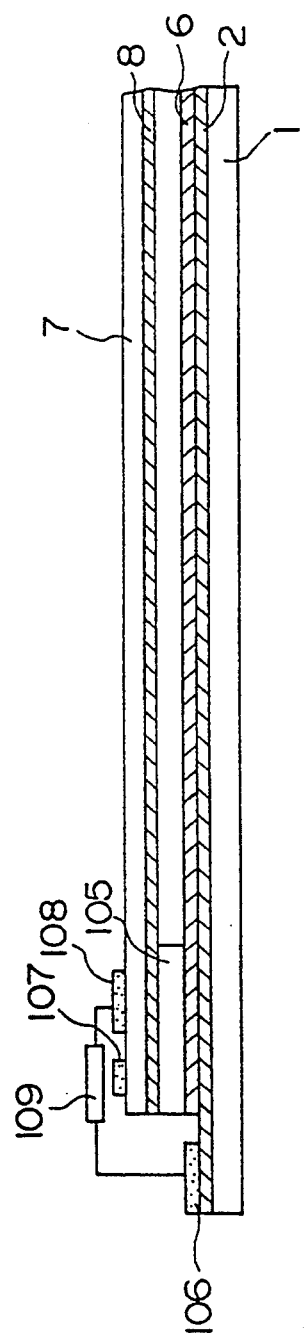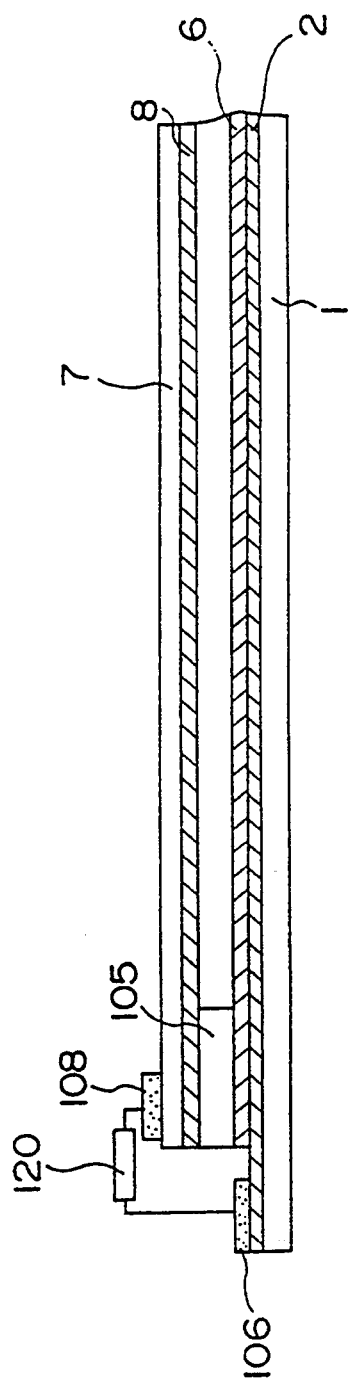

FIG. 30(A)
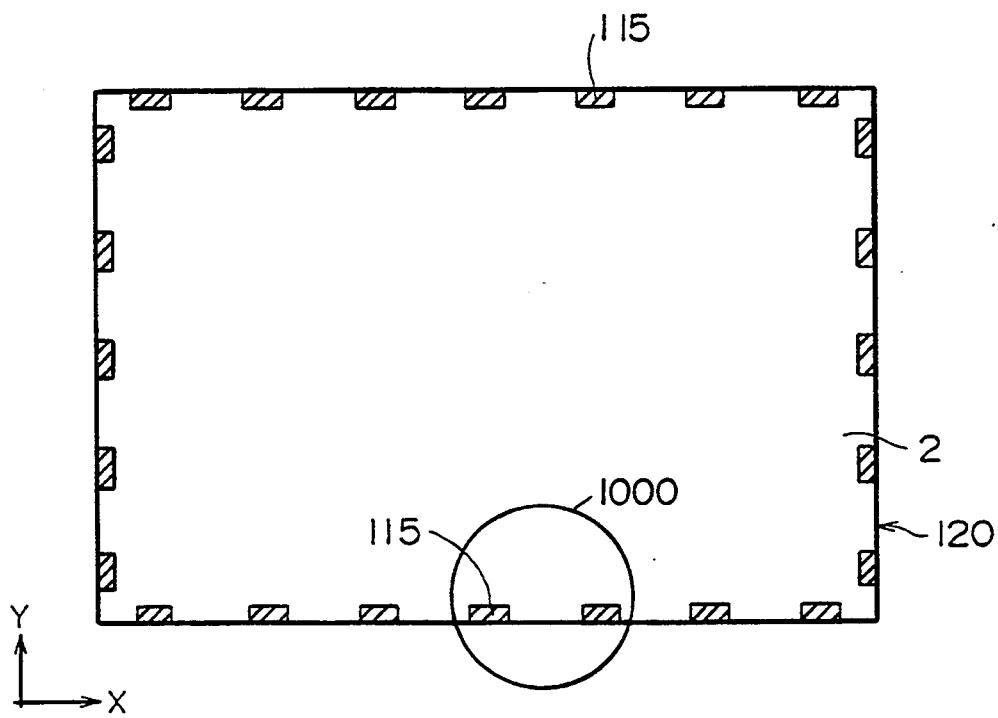
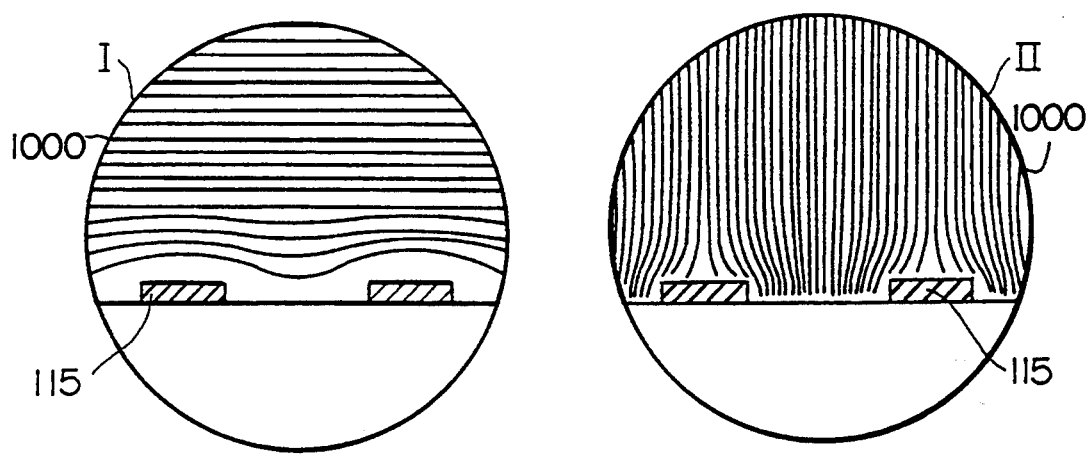
FIG. 30(B)  FIG. 30(C)

F I G . 3 1
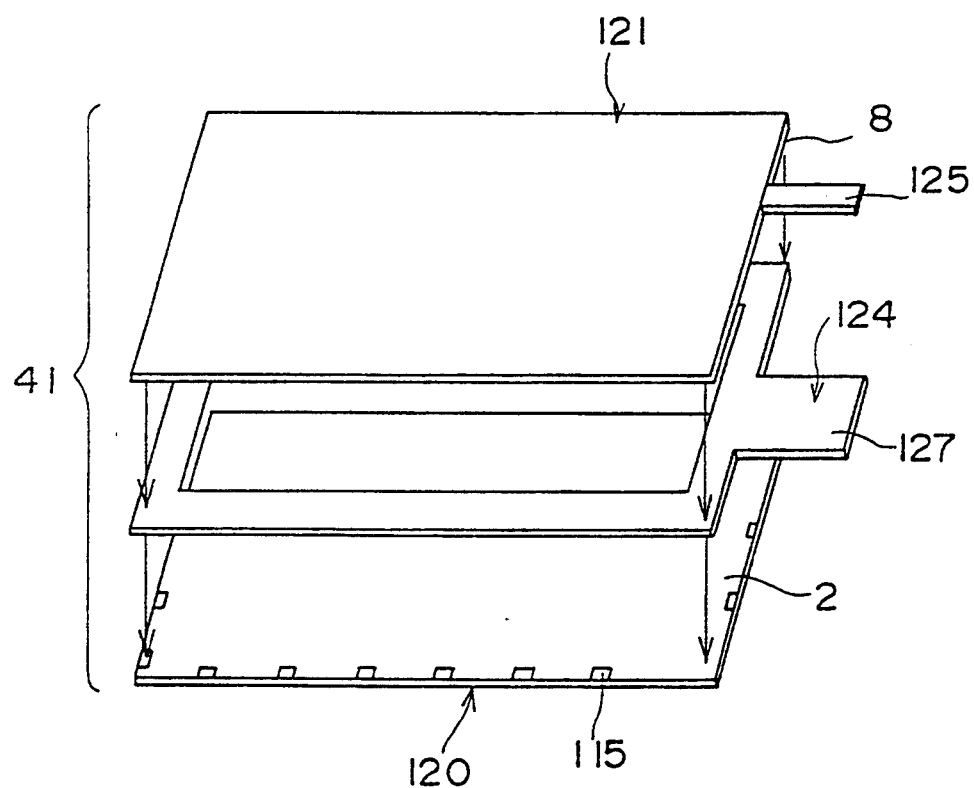

TOUCH PANEL FOR DETECTING A COORDINATE OF AN ARBITRARY POSITION WHERE PRESSURE IS APPLIED

BACKGROUND OF THE INVENTION

The present invention generally relates to coordinate input apparatuses, and more particularly to a coordinate input apparatus which inputs coordinate information related to a position on a touch panel when pressure is applied at this position by a pen or the like.

Recently, various kinds of input apparatuses have been developed for inputting hand-written information to a computer or the like. Such input apparatuses use a coordinate input apparatus having a touch panel, and coordinate information related to a position on the touch panel is detected by the coordinate input apparatus when pressure is applied at this position by a pen or other pressure applying member. In this coordinate input apparatus, it is essential that the position on the touch panel where the pressure is applied can be detected with a high accuracy.

For example, a Japanese Laid-Open Patent Application No. 56-11582 proposes a coordinate input apparatus using switching elements which use diodes. A plurality of point electrodes are provided on a resistor layer, and the switching elements are used to control voltages which are applied in X and Y directions of the point electrodes. When a pressure is applied by a pen or the like at an arbitrary position on a conductor layer which confronts the resistor layer, this arbitrary position is recognized by detecting the position in both the X and Y directions.

On the other hand, a Japanese Laid-Open Patent Application No. 58-35679 proposes a coordinate input apparatus using analog switches as the switching elements.

In the coordinate input apparatuses proposed in the Japanese Laid-Open Patent Applications No. 56-11582 and No. 58-35679 described above, the point electrodes are connected to the resistor layer, and voltages are applied to the point electrodes via the corresponding switching elements so as to obtain a potential distribution which is uniform along the X and Y directions. However, the switching elements are provided on a substrate which is independent of a substrate which is provided with the resistor layer. For this reason, there was a problem in that a number of wiring lines corresponding to the number of point electrodes must be drawn out from the substrate which is provided with the resistor layer.

In other words, the equipotential lines of the acting electric field become approximately linear at the peripheral part of the touch panel if a large number of point electrodes are provided with respect to each side of the touch panel. The position detecting accuracy is improved by providing the large number of point electrodes. However, as the number of point electrodes increases, the number of wiring lines which must be drawn out from the point electrodes increases considerably. For example, if nine point electrodes are provided with respect to one side of the touch panel, it is necessary to provide thirty-six wiring lines which are drawn out from the nine point electrodes.

On the other hand, it must be possible to distinguish the pressure applied on the touch panel by an operator's hand and the pressure applied by the pen. But in order to realize the electrical contact between the conductor layer and the resistor layer only if the pressure is applied on the touch panel by the pen, the tip of the pen must be made extremely fine. In addition, there was a problem in that an accurate coordinate detection cannot be made unless the electrical contact between the conductor layer and the resistor layer is detected with a short detection period by turning the switching elements ON/OFF at extremely short intervals. This is because spacer pieces provided between the conductor layer and the resistor layer are extremely small and are arranged at extremely fine intervals.

SUMMARY OF THE INVENTION

Accordingly, it is a general object of the present invention to provide a novel and useful coordinate input apparatus in which the problems described above are eliminated.

Another and more specific object of the present invention is to provide a touch panel adapted for detecting a coordinate of an arbitrary position where a pressure is applied, comprising a substrate, a resistor layer provided on the substrate, a spacer layer made of an insulator material, a conductor layer confronting the resistor layer via the spacer layer, a plurality of point electrodes provided on the resistor layer at a peripheral part of the resistor layer along each side of the resistor layer, and a plurality of switching elements provided above the substrate and electrically coupled to the point electrodes for applying a voltage to the point electrodes, where the spacer layer is made up of a plurality of spacer pieces which are arranged so that an electrical contact is made between the conductor layer and the resistor layer when a pressure is applied at an arbitrary position on the conductor layer. According to the touch panel of the present invention, it is possible to reduce the size of the touch panel and also effectively utilize the dead space other than the effective input region of the touch panel.

Still another object of the present invention is to provide a coordinate input apparatus comprising a substrate, a resistor layer provided on the substrate, a spacer layer made of an insulator material, a conductor layer confronting the resistor layer via the spacer layer, a plurality of point electrodes provided on the resistor layer at a peripheral part of the resistor layer along each side of the resistor layer, a plurality of switching elements provided above the substrate and electrically coupled to the point electrodes for applying a voltage to the point electrodes, contact detection means for detecting in an activated state thereof an electrical contact between the conductor layer and the resistor layer when a pressure is applied on the conductor layer at an arbitrary position, and control means including measuring means for measuring a coordinate of the arbitrary position by applying a voltage to the point electrodes in a predetermined sequence if the contact detection means detects the electrical contact, where the spacer layer is made up of a plurality of spacer pieces which are arranged so that the electrical contact is made between the conductor layer and the resistor layer when the pressure is applied at the arbitrary position on the conductor layer. According to the coordinate input apparatus of the present invention, it is possible to reduce the current consumption, and also positively and accurately detect the input coordinate.

Other objects and further features of the present invention will be apparent from the following detailed description when read in conjunction with the accompanying drawings.

BRIEF DESCRIPTION OF THE DRAWINGS

FIG. 12 is a cross sectional view showing an essential part of a fourth embodiment of the coordinate input apparatus according to the present invention;

FIG. 13 is a cross sectional view showing an essential part of a fifth embodiment of the coordinate input apparatus according to the present invention;

FIG. 14 is a cross sectional view showing an essential part of a sixth embodiment of the coordinate input apparatus according to the present invention;

FIG. 15 is a cross sectional view showing an essential part of a seventh embodiment of the coordinate input apparatus according to the present invention;

FIG. 30 is a diagram for explaining equipotential lines in the vicinity of the point electrodes;

FIG. 31 is a disassembled perspective view showing the touch panel of the thirteenth embodiment;

DESCRIPTION OF THE PREFERRED EMBODIMENTS

Figure 1:
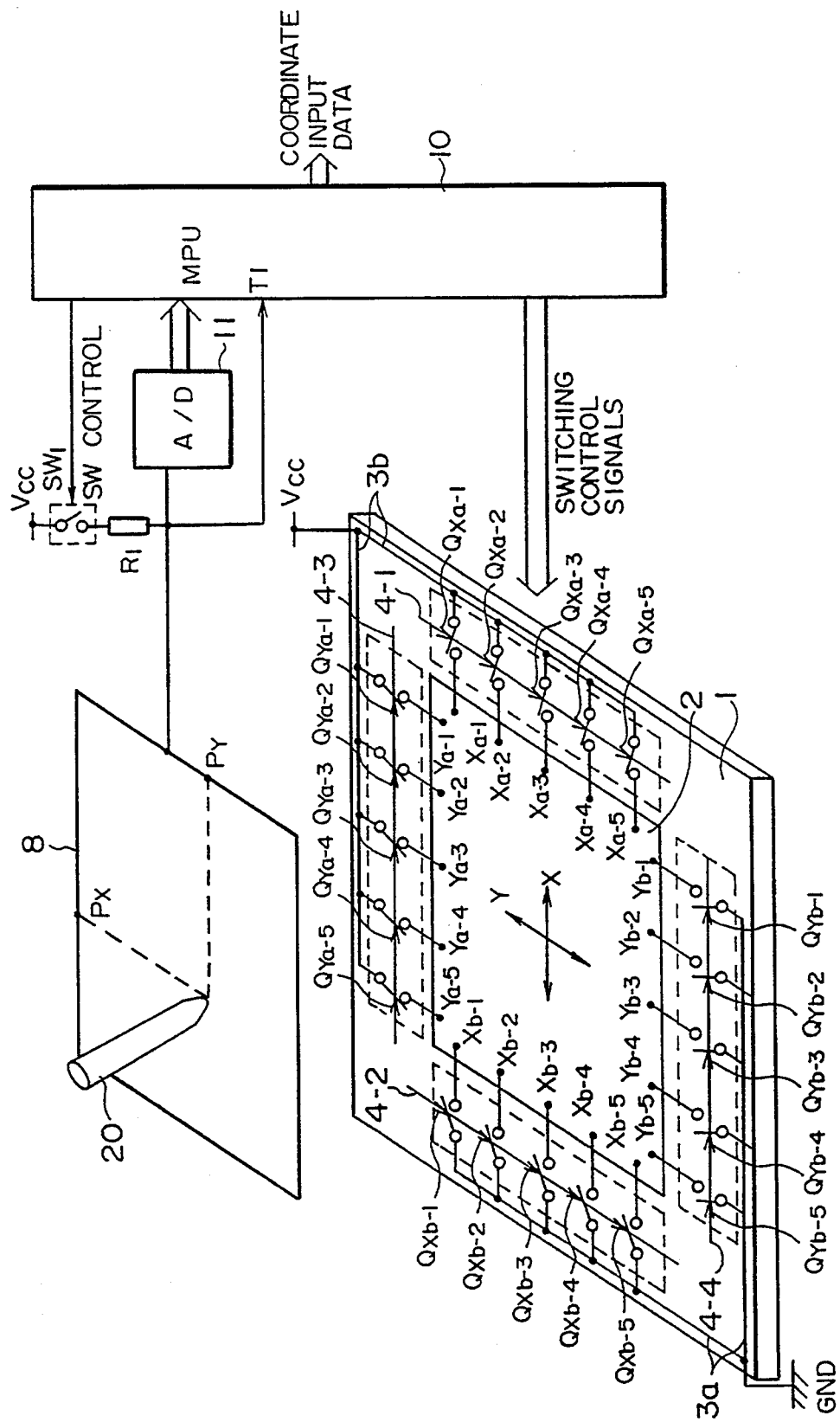
FIG. 1 generally shows a first embodiment of a coordinate input apparatus according to the present invention.

FIG. 1 generally shows a first embodiment of a coordinate input apparatus according to the present invention. In FIG. 1, a rectangular resistor layer 2 is formed on a glass substrate 1. The resistor layer 2 is made of a transparent conductor material such as indium-tin-oxide (ITO). Confronting point electrodes $X_{a-1}$ through $X_{a-5}$ and $X_{b-1}$ through $X_{b-5}$ are formed on the resistor layer 2 along a direction X. In addition, confronting point electrodes $Y_{a-1}$ through $Y_{a-5}$ and $Y_{b-1}$ through $Y_{b-5}$ are formed on the resistor layer 2 along a direction Y which is perpendicular to the direction X. Field effect transistors (FETs) $Q_{Xa-1}$ through $Q_{Xa-5}$, $Q_{Xb-1}$ through $Q_{Xb-5}$, $Q_{Ya-1}$ through $Q_{Ya-5}$, and $Q_{Yb-1}$ through $Q_{Yb-5}$ are respectively connected to the point electrodes $X_{a-1}$ through $X_{a-5}$, $X_{b-1}$ through $X_{b-5}$, $Y_{a-1}$ through $Y_{a-5}$, and $Y_{b-1}$ through $Y_{b-5}$. These FETs $Q_{Xa-1}$ through $Q_{Xa-5}$, $Q_{Xb-1}$ through $Q_{Xb-5}$, $Q_{Ya-1}$ through $Q_{Ya-5}$, and $Q_{Yb-1}$ through $Q_{Yb-5}$ are provided on the glass substrate 1 as the switching elements.

Figure 2:
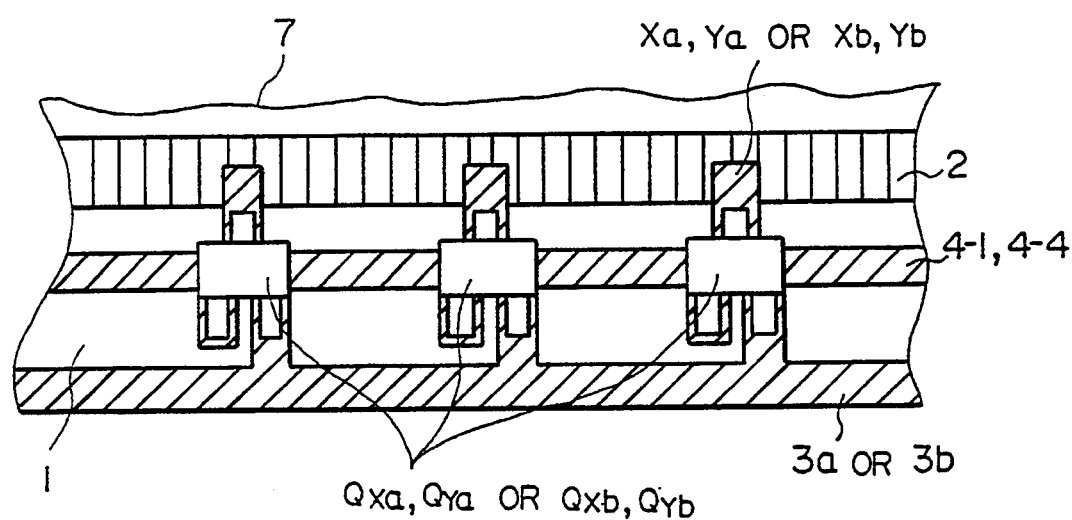
FIG. 2 is a plan view showing an essential part of the first embodiment.
Figure 3:
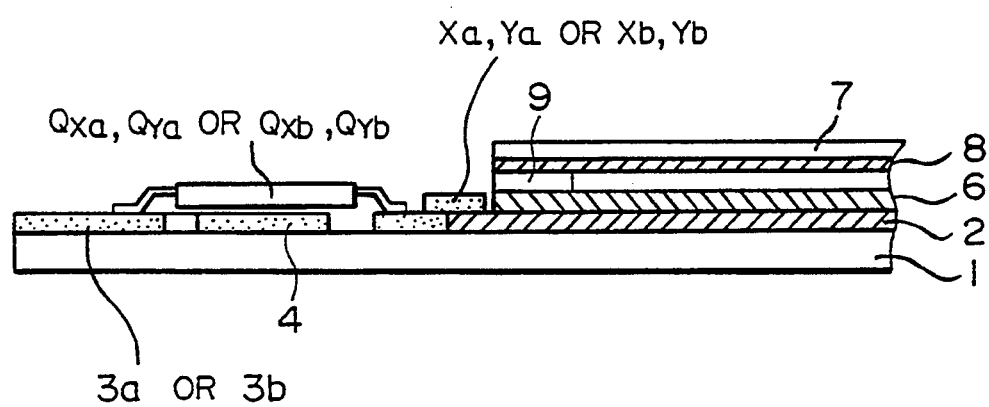
FIG. 3 is a cross sectional view showing an essential part of the first embodiment.

FIG. 2 shows a plan view of an essential part of the first embodiment, and FIG. 3 shows a cross sectional view of an essential part of the first embodiment. A description will be given of a method of producing a touch panel, by referring to FIGS. 2 and 3.

First, the resistor layer 2 is formed on the glass substrate 1, and parts where the switching elements are to be formed are etched. Then, a spacer 6 made of an insulator material is formed on the resistor layer 2, so that the resistor layer 2 makes contact with a conductor layer 8 which will be described later only if a pressure is applied to the conductor layer 8 via a polyethylene telephthalate (PET) sheet 7 which is provided as a protecting layer. The spacer 6 may be formed by screen printing, photolithography using a photosensitive resin material, providing fine spacer pieces in a distributed manner and the like.

Thereafter, power supply electrode lines 3a and 3b, gate lines 4, and the point electrodes $X_{a-1}$ through $X_{a-5}$, $X_{b-1}$ through $X_{b-5}$, $Y_{a-1}$ through $Y_{a-5}$, and $Y_{b-1}$ through $Y_{b-5}$ are formed on the glass substrate 1 by printing a conductive material such as Ag paste. A thermal process is carried out after mounting the FETs $Q_{Xa-1}$ through $Q_{Xa-5}$, $Q_{Xb-1}$ through $Q_{Xb-5}$, $Q_{Ya-1}$ through $Q_{Ya-5}$, and $Q_{Yb-1}$ through $Q_{Yb-5}$. The number of FETs $Q_{Xa}$, $Q_{Xb}$, $Q_{Ya}$ and $Q_{Yb}$ which are provided with respect to one side of the glass substrate 1 is determined by the required effective input area. The ratio of the effective input region of the touch panel with respect to the entire area of the glass substrate 1 becomes larger as the number of electrodes increases.

Figure 4:
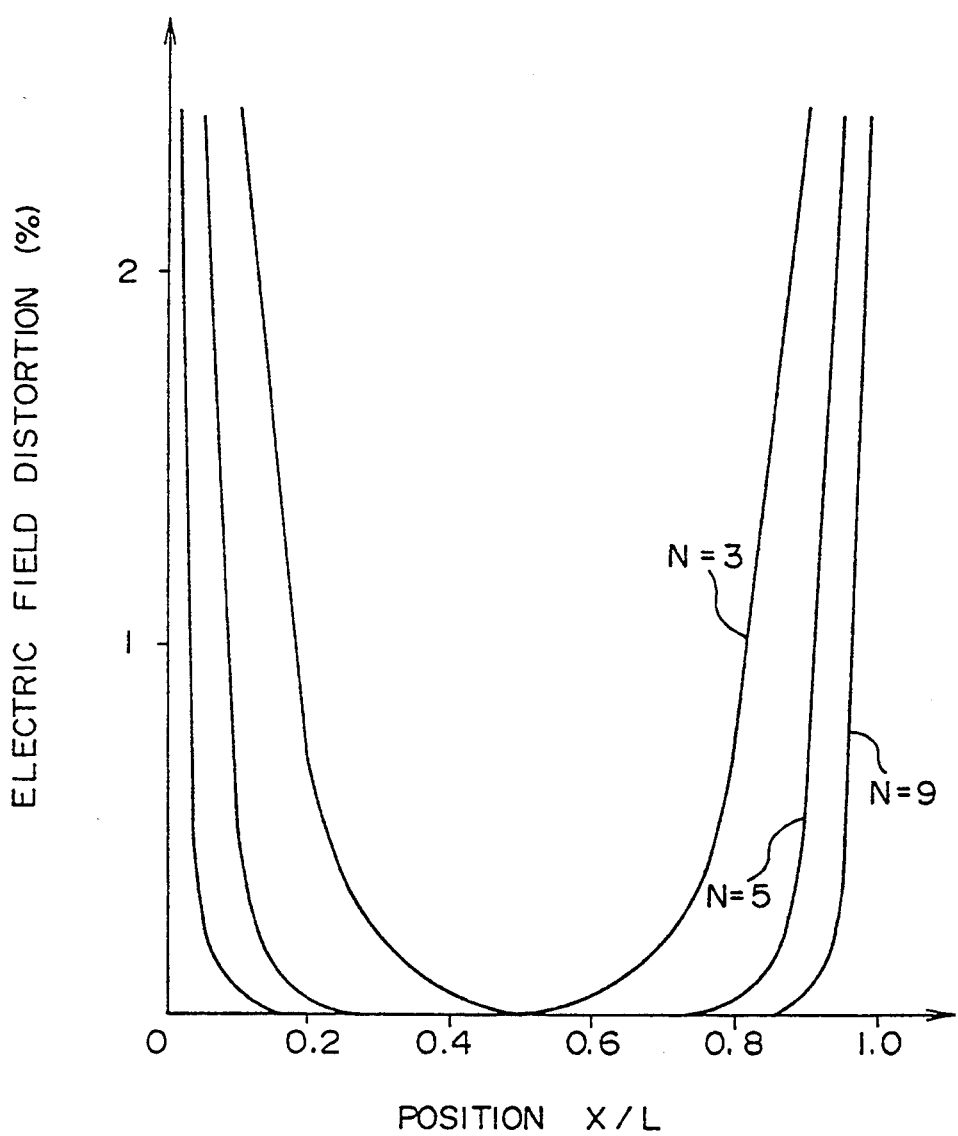
FIG. 4 shows position versus electrical field distortion characteristics for different parameters corresponding to the number of electrodes provided along one side of a glass substrate.

FIG. 4 shows position versus electric field distortion characteristics for different parameters corresponding to the number of electrodes provided along one side of the glass substrate 1, where N denotes the number of electrodes. For example, the effective input region along one axis is approximately 90% for N=9 if the electric field distortion is 0.2%.

An opposing substrate body is formed by forming the conductor layer 8 on the PET sheet 7 by evaporation and printing Ag paste or the like to form draw-out electrodes. The conductor layer 8 is made of a transparent conductor material such as ITO. The opposing substrate body is adhered on the glass substrate body which is made up of the glass substrate 1, the resistor layer 2, the spacer 6 and the like. More particularly, the conductor layer 8 of the opposing substrate body is adhered on the spacer 6 of the glass substrate body by an adhesive agent 9.

Returning now to the description of FIG. 1, the FETs $Q_{Xa-1}$ through $Q_{Xa-5}$ have sources connected to the power supply electrode (Vcc) line 3b, drains connected to the resistor layer 2, and gates connected to a gate line 4-1. The FETs $Q_{Xb-1}$ through $Q_{Xb-5}$ have sources connected to the power supply electrode (ground: GND) line 3a, drains connected to the resistor layer 2, and gates connected to a gate line 4-2. The FETs $Q_{Ya-1}$ through $Q_{Ya-5}$ have sources connected to the Vcc line 3b, drains connected to the resistor layer 2, and gates connected to a gate line 4-3. In addition, the FETs $Q_{Yb-1}$ through $Q_{Yb-5}$ have sources connected to the GND line 3a, drains connected to the resistor layer 2, and gates connected to a gate line 4-4.

The gate lines 4-1 through 4-4 are connected to a microprocessor unit (MPU) 10. The MPU 10 supplies to the gate lines 4-1 through 4-4 signals which alternately take high and low levels, so that high-level signals are supplied to the gate lines 4-1 and 4-2 while low-level signals are supplied to the gate lines 4-3 and 4-4, and vice versa. As a result, the FETs $Q_{Xa-1}$ through $Q_{Xa-5}$ and $Q_{Xb-1}$ through $Q_{Xb-5}$ and the FETs $Q_{Ya-1}$ through $Q_{Ya-5}$ and $Q_{Yb-1}$ through $Q_{Yb-5}$ are alternately turned ON/OFF, so that the FETs $Q_{Xa-1}$ through $Q_{Xa-5}$ and $Q_{Xb-1}$ through $Q_{Xb-5}$ are turned ON while the FETs $Q_{Ya-1}$ through $Q_{Ya-5}$ and $Q_{Yb-1}$ through $Q_{Yb-5}$ are turned OFF, and vice versa.

The conductor layer 8 is coupled to the MPU 10 via a correction switch circuit 12 and an analog-to-digital (A/D) converter 11. The conductor layer 8 is also connected directly to an interrupt input terminal T1 of the MPU 10. In addition, the conductor layer 8 is applied with a power supply voltage Vcc via a switch SW1 and a resistor R1. A control terminal of the switch SW1 is connected to the MPU 10. The switch SW1 is turned ON/OFF by a control signal which is supplied to the control terminal from the MPU 10.

Figure 5:
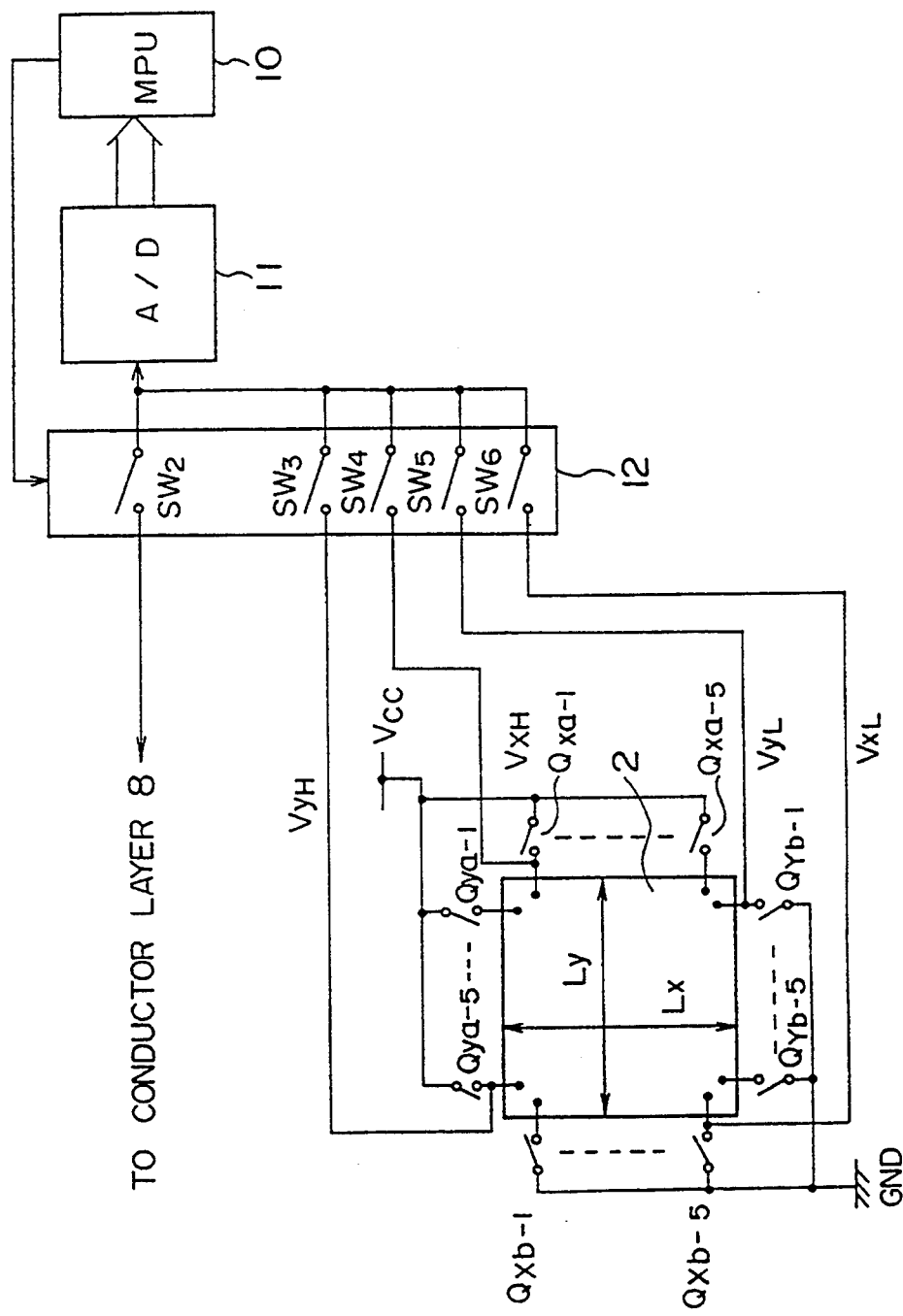
FIG. 5 is a system block diagram showing an essential part of the first embodiment.

FIG. 5 is a system block diagram showing an essential part of the first embodiment. In FIG. 5, the correction switch circuit 12 includes five switches SW2 through SW6. The switch SW2 controls the connection between the conductor layer 8 and the A/D converter 11. The switch SW3 controls the connection between the point electrode $Y_{a-5}$ and the A/D converter 11. The switch SW4 controls the connection between the point electrode $X_{a-1}$ and the A/D converter 11. The switch SW5 controls the connection between the point electrode $Y_{b-1}$ and the A/D converter 11. The switch SW6 controls the connection between the point electrode $X_{b-5}$ and the A/D converter 11. The switches SW2 through SW6 are controlled by the MPU 10 when obtaining correction data, so as to control the connections between the A/D converter 11 and the conductor layer 8 and the point electrodes $X_{a-1}$, $X_{b-5}$, $Y_{a-5}$ and $Y_{b-1}$.

When obtaining the correction data, the switch SW2 is first turned OFF. In addition, the switches SW3, SW5 and SW6 are turned OFF, and only the switch SW4 is turned ON. As a result, a potential $V_{XH}$ at the point electrode $X_{a-1}$ is supplied to the A/D converter 11. In other words, the potential $V_{XH}$ is subjected to an A/D conversion and then supplied to the MPU 10. The potential $V_{XH}$ is the voltage obtained by subtracting a voltage drop at the FET $Q_{Xa-1}$ from the power supply voltage Vcc, and indicates a maximum value in the direction X. Next, the switches SW3 through SW5 are turned OFF and only the switch SW6 is turned ON. Hence, the point electrode $X_{b-5}$ and the A/D converter 11 are connected. The MPU 10 detects a potential $V_{XL}$ at the point electrode $X_{b-5}$, which indicates a minimum value in the direction X.

The MPU 10 obtains a contact position $P_X$ from the potentials $V_{XH}$ and $V_{XL}$ based on the following formula (1), where $L_X$ indicates the length of the resistor layer 2 in the direction X and $V_X$ indicates the potential at the contact position $P_X$. The contact position $P_X$ is the X-coordinate position where the conductor layer 8 and the resistor layer 2 make electrical contact due to pressure applied on the conductor layer 8 via the PET sheet 7 by a pen 20 or the like.

$$P_X = L_X \times [(V_X - V_{XL})/(V_{XH} - V_{XL})] \qquad (1)$$

Similarly, the MPU 10 obtains a maximum potential $V_{YH}$ and a minimum potential $V_{YL}$ in the direction Y, and obtains a contact position $P_Y$ based on the following formula (2), where $L_Y$ indicates the length of the resistor layer 2 in the direction Y and $V_Y$ indicates the potential at the contact position $P_Y$. The contact position $P_Y$ is the Y-coordinate position where the conductor layer 8 and the resistor layer 2 make electrical contact due to a pressure applied on the conductor layer 8 via the PET sheet 7 by the pen 20 or the like.

$$P_Y = L_Y \times [(V_Y - V_{YL})/(V_{YH} - V_{YL})] \qquad (2)$$

Figure 6:
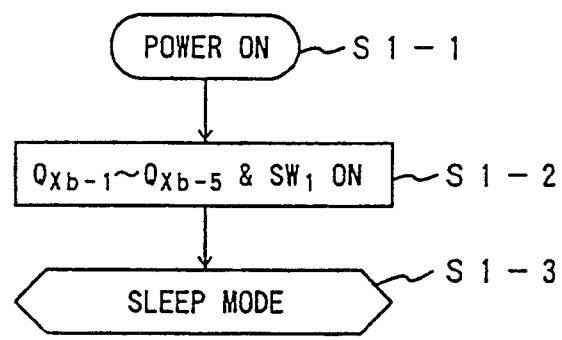
FIG. 6 is a flow chart for explaining an operation of the first embodiment.
Figure 7:
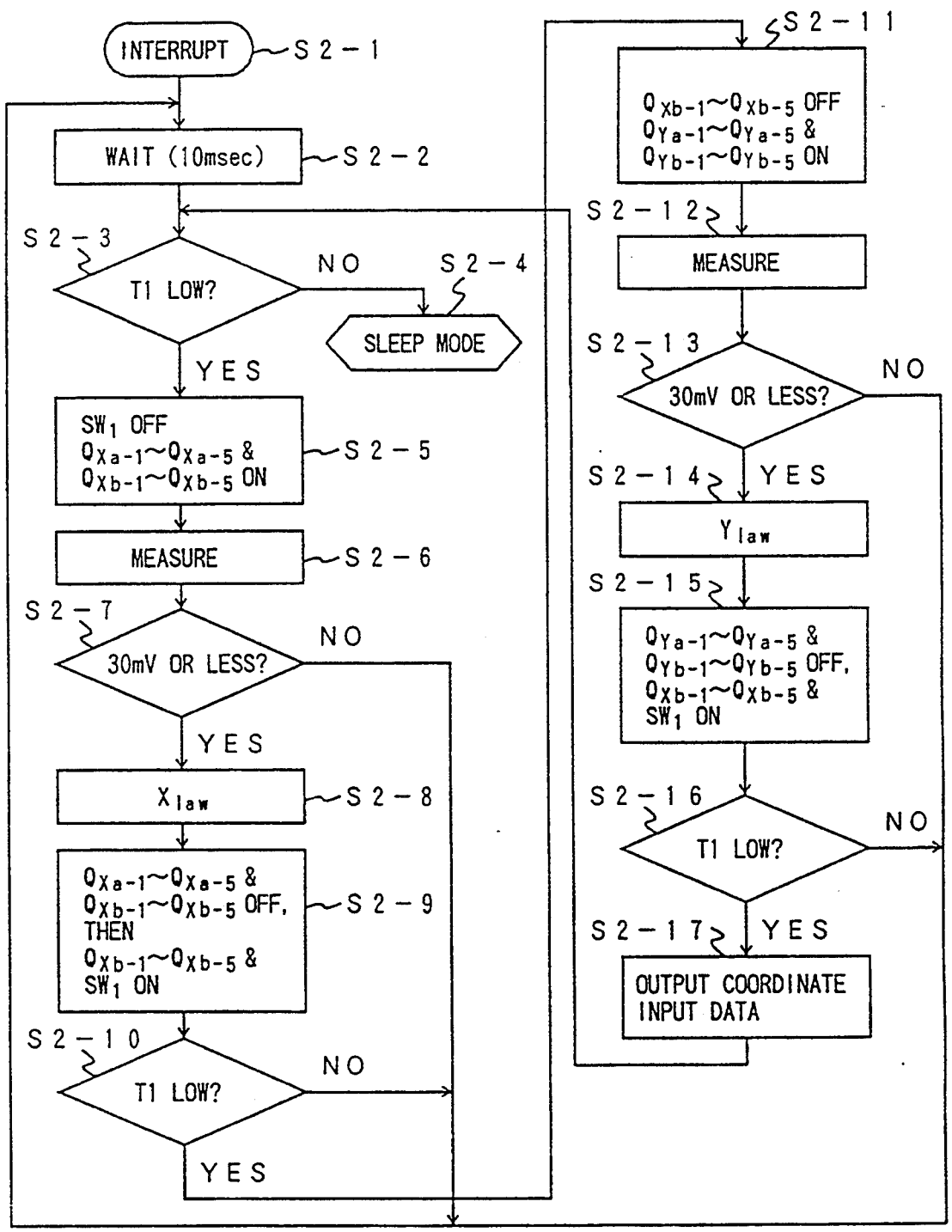
FIG. 7 is a flow chart for explaining the operation of the first embodiment.

Next, a description will be given of the operation of the first embodiment, by referring to FIGS. 6 and 7. FIGS. 6 and 7 are flow charts showing the operation of the MPU 10.

In FIG. 6, the power is turned ON in a step S1-1, and the FETs $Q_{Xb\text{-}1}$ through $Q_{Xb\text{-}5}$ are turned ON and the switch SW1 is turned ON in a step S1-2. Hence, the coordinate input apparatus assumes a sleep mode in a step S1-3. The current consumption is only several μA, for example, and is small in this sleep mode.

If a pressure is applied at an arbitrary X-Y coordinate on the PET sheet 7 by the pen 20 during the sleep mode of the coordinate input apparatus, the conductor layer 8 makes contact with the resistor layer 2 at this arbitrary X-Y coordinate. Accordingly, a low-level signal is applied to the interrupt input terminal T1 of the MPU 10. The operation mode of the coordinate input apparatus changes to a normal mode from the sleep mode in response to the low-level signal which is applied to the interrupt input terminal T1, and the MPU 10 starts an interrupt process shown in FIG. 7.

In FIG. 7, if the MPU 10 starts the interrupt process in a step S2-1, a predetermined time of 10 msec, for example, is waited in a step S2-2. Thereafter, a step S2-3 decides whether or not the signal level applied to the interrupt input terminal T1 of the MPU 10 is still low. If the decision result in the step S2-3 is NO, it is regarded that the pressure applied on the PET sheet 7 was not intended to input coordinate information, and the operation mode of the coordinate input apparatus is returned to the sleep mode in a step S2-4.

On the other hand, if the decision result in the step S2-3 is YES, it is regarded that the pressure applied on the PET sheet 7 was intended to input the coordinate information, and the process advances to a step S2-5. More particularly, the switch SW1 is turned OFF so that the potential at the contact position ($P_X$, $P_Y$) pressed by the pen 20 can be read by the A/D converter 11, the FETs $Q_{Xa\text{-}1}$ through $Q_{Xa\text{-}5}$ and $Q_{Xb\text{-}1}$ through $Q_{Xb\text{-}5}$ are turned ON, and the FETs $Q_{Ya\text{-}1}$ through $Q_{Ya\text{-}5}$ and $Q_{Yb\text{-}1}$ through $Q_{Yb\text{-}5}$ are turned OFF in the step S2-5, so as to detect the voltage in the direction X. In other words, the contact point PX is obtained.

A step S2-6 measures the voltage at the contact point $P_X$ a plurality of times, so as to correct the voltage in the direction X if inconsistent. In this embodiment, the voltage is measured 32 times. A step S2-7 decides whether or not the errors among the measured voltages in the direction X is a predetermined value or less. In this embodiment, this predetermined value is 30 mV. If the decision result in the step S2-7 is NO, it is regarded that the input is abnormal or that the applied pressure was not intended to input the coordinate information, and the process returns to the step S2-2.

On the other hand, if the decision result in the step S2-7 is YES, it is regarded that the applied pressure was intended to input the coordinate information, and a X-coordinate data $X_{law}$ is obtained by averaging all of the measured voltages at the contact point $P_X$ in a step S2-8. Then, the FETs $Q_{Xa\text{-}1}$ through $Q_{Xa\text{-}5}$ and $Q_{Xb\text{-}1}$ through $Q_{Xb\text{-}5}$ are turned OFF, and the switch Sw1 and the FETs $Q_{Xb\text{-}1}$ through $Q_{Xb\text{-}5}$ are thereafter turned ON in the step S2-9. In addition, a step S2-10 decides whether or not the signal level at the interrupt input terminal T1 of the MPU 10 is low. If the decision result in the step S2-10 is NO, it is judged that no measurement can be made because no pressure is applied on the PET sheet 7, and the process returns to the step S2-2. But if the decision result in the step S2-10 is YES, it is regarded that the pressure is applied by the pen 20, and the process advances to a step S2-11 so as to detect the contact point $P_Y$ in the direction Y.

More particularly, the FETs $Q_{Xb\text{-}1}$ through $Q_{Xb\text{-}5}$ are turned OFF, and the FETs $Q_{Ya\text{-}1}$ through $Q_{Ya\text{-}5}$ and $Q_{Yb\text{-}1}$ through $Q_{Yb\text{-}5}$ are turned ON in the step S2-11, so as to detect the voltage in the direction Y. In other words, the contact point $P_Y$ is obtained.

A step S2-12 measures the voltage at the contact point $P_Y$ a plurality of times, so as to correct the voltage in the direction Y if inconsistent. In this embodiment, the voltage is measured 32 times. A step S2-13 decides whether or not the errors among the measured voltages in the direction Y is a predetermined value or less. In this embodiment, this predetermined value is 30 mV. If the decision result in the step S2-13 is NO, it is regarded that the input is abnormal or that the applied pressure was not intended to input the coordinate information, and the process returns to the step S2-2.

On the other hand, if the decision result in the step S2-13 is YES, it is regarded that the applied pressure was intended to input the coordinate information, and a Y-coordinate data $Y_{law}$ is obtained by averaging all of the measured voltages at the contact point $P_Y$ in a step S2-14. Then, the FETs $Q_{Ya\text{-}1}$ through $Q_{Ya\text{-}5}$ and $Q_{Yb\text{-}1}$ through $Q_{Yb\text{-}5}$ are turned OFF, and the switch SW1 and the FETs $Q_{Yb\text{-}1}$ through $Q_{Yb\text{-}5}$ are thereafter turned ON in the step S2-15. In addition, a step S2-16 decides whether or not the signal level at the interrupt input terminal T1 of the MPU 10 is low. If the decision result in the step S2-16 is NO, it is judged that no measurement can be made because no pressure is applied on the PET sheet 7, and the process returns to the step S2-2. In other words, it is judged that pressure applied by the pen 20 or the like was released instantaneously. But if the decision result in the step S2-16 is YES, it is regarded that the pressure is applied by the pen 20, and the process advances to a step S2-17.

If the decision result in the step S2-16 is YES, it is judged that the pressure continues to be applied by the pen 20 and that the coordinate information is to be input. Hence, the step S2-17 obtains the contact position ($P_X$, $P_Y$) based on the formulas (1) and (2) described above using the maximum and minimum potentials which are obtained in advance from the X and Y coordinate data $X_{law}$ and $Y_{law}$. The contact position ($P_X$, $P_Y$) is output as the coordinate input data, and the process returns to the step S2-3 to repeat the above described operation, that is, to successively read the input coordinate information which is input by the pen 20. For example, the obtained coordinate input data is supplied to a host unit (not shown).

According to this embodiment, the resistor layer 2 and the FETs $Q_{Xa\text{-}1}$ through $Q_{Xa\text{-}5}$, $Q_{Xb\text{-}1}$ through $Q_{Xb\text{-}5}$, $Q_{Ya\text{-}1}$ through $Q_{Ya\text{-}5}$, and $Q_{Yb\text{-}1}$ through $Q_{Yb\text{-}5}$ are all provided on the glass substrate 1. In addition, the necessary electrical connections are made by a wiring pattern which is formed when forming the resistor layer 2 on the glass substrate 1. For this reason, only 4 gate lines, 1 power line for supplying the power supply voltage Vcc, and 1 power line for grounding need to be provided in order to connect the coordinate input apparatus to an external unit. As a result, it is possible to reduce the number of lines which are required for the external connection. Furthermore, since the MPU 10 only needs to operate when inputting the coordinate information, it is possible to effectively reduce the current consumption.

Figure 8:
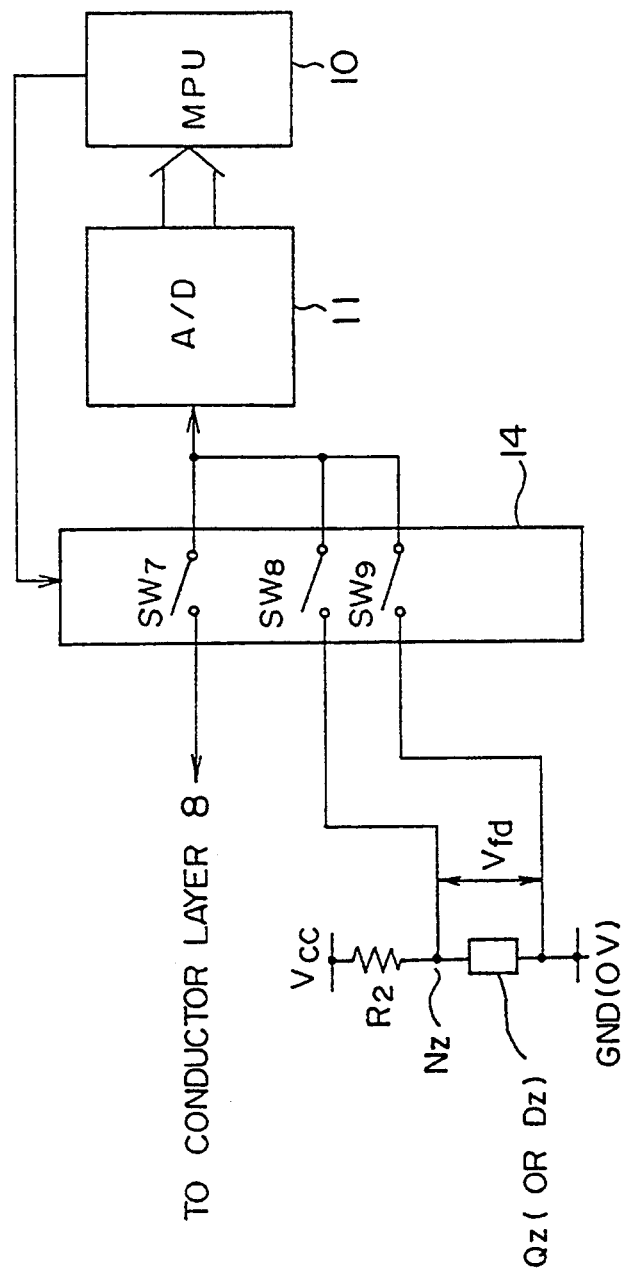
FIG. 8 is a system block diagram showing an essential part of a second embodiment of the coordinate input apparatus according to the present invention.

Next, a description will be given of a second embodiment of the coordinate input apparatus according to the present invention, by referring to FIG. 8. FIG. 8 is a system block diagram showing an essential part of the second embodiment. In FIG. 8, those parts which are the same as those corresponding parts in FIGS. 1 through 3 are designated by the same reference numerals, and a description thereof will be omitted.

This second embodiment calculates the position from the detected potentials $V_X$ and $V_Y$ using a method which is different from the method used in the first embodiment, by taking into account the voltage drop introduced at each switching element. The construction and operation of this second embodiment are otherwise the same as those of the first embodiment.

In this embodiment, a FET $Q_Z$ is used to obtain constants of the operation formula. This FET $Q_Z$ is of the same type as the FETs $Q_{Xa\text{-}1}$ through $Q_{Xa\text{-}5}$, $Q_{Xb\text{-}1}$ through $Q_{Xb\text{-}5}$, $Q_{Ya\text{-}1}$ through $Q_{Ya\text{-}5}$, and $Q_{Yb\text{-}1}$ through $Q_{Yb\text{-}5}$.

As shown in FIG. 8, a resistor R2 and the FET $Q_Z$ are connected in series between the power supply voltage Vcc and the ground GND of 0 V. The FET $Q_Z$ is turned ON, and the resistance of the resistor R2 is restricted so that a current flowing through the FET $Q_Z$ is the same as the current which flows through such a FET when the coordinate input apparatus is activated. The voltage which is applied to the FET $Q_Z$ in this state is measured beforehand. Such a measurement can be made by switching the connection to the A/D converter 11 by a switching circuit 14.

The switching circuit 14 includes switches SW7, SW8 and SW9. The switch SW7 controls the connection between the conductor layer 8 and the A/D converter 11. The switch SW8 controls the connection between a node $N_Z$ which connects the resistor R2 and the FET $Q_Z$ and the A/D converter 11. In addition, the switch SW9 controls the connection between the ground GND and the A/D converter 11.

When obtaining a voltage Vfd which is applied to the FET $Q_Z$, the switch SW7 is first turned OFF. Then, the switch SW8 is turned ON and the switch SW9 is turned OFF, so as to obtain the potential at the node $N_Z$ which connects the resistor R2 and the FET $Q_Z$. Next, the switch SW9 is turned ON and the switch SW8 is turned OFF. so as to obtain the ground potential. The MPU 10 obtains a potential difference between the potential at the node $N_Z$ and the ground potential, and regards this potential difference as the voltage Vfd.

The power supply voltage Vcc is applied to the resistor layer 2 via the $Q_{Xa\text{-}1}$ through $Q_{Xa\text{-}5}$ and $Q_{Xb\text{-}1}$ through $Q_{Xb\text{-}5}$ or the FETs $Q_{Ya\text{-}1}$ through $Q_{Ya\text{-}5}$ and $Q_{Yb\text{-}1}$ through $Q_{Yb\text{-}5}$. For this reason, the voltage which is actually applied to the resistor layer 2 can be obtained from Vcc-2 Vfd. Accordingly, the contact position $P_X$ in the direction X can be obtained from the following formula (3), where $L_X$ denotes the length of the resistor layer 2 in the direction X and $V_X$ denotes the potential at the contact position $P_X$.

$$P_X = L_X \times [(V_X - Vfd)/(Vcc - 2\ Vfd)] \qquad (3)$$

Similarly, the contact position $P_Y$ in the direction Y can be obtained from the following formula (4), where $L_Y$ denotes the length of the resistor layer 2 in the direction Y and $V_Y$ denotes the potential at the contact position $P_Y$.

$$P_Y = L_Y \times [(V_Y - Vfd)/(Vcc - 2\ Vfd)] \qquad (4)$$

Therefore, in this embodiment, the contact position $(P_X, P_Y)$ can be obtained based on the formulas (3) and (4) described above, and the accuracy of the coordinate detection is improved by carrying out a correction by taking into account the voltage drop introduced at each switching element.

Figure 9:
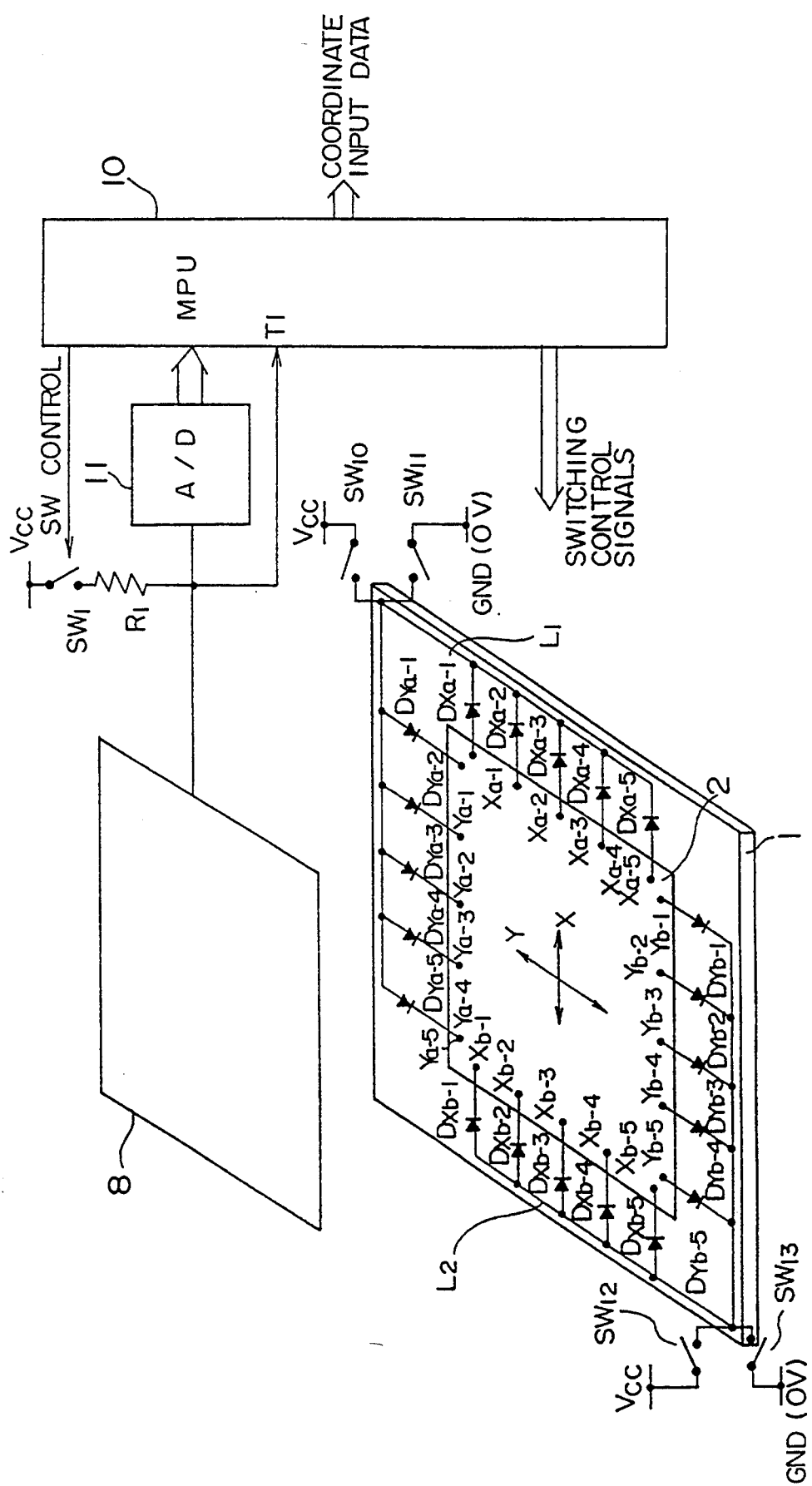
FIG. 9 generally shows a third embodiment of the coordinate input apparatus according to the present invention.

Next, a description will be given of a third embodiment of the coordinate input apparatus according to the present invention, by referring to FIG. 9. FIG. 9 shows an essential part of the third embodiment. In FIG. 9, those parts which are the same as those corresponding parts in FIG. 1 are designated by the same reference numerals, and a description thereof will be omitted.

This third embodiment uses diodes as the switching elements, instead of the FETs. In addition, no gate lines 4-1 through 4-4 are provided. Otherwise, the third embodiment is basically the same as the first embodiment described above.

In FIG. 9, diodes $D_{Xa\text{-}1}$ through $D_{Xa\text{-}5}$, $D_{Xb\text{-}1}$ through $D_{Xb\text{-}5}$, $D_{Ya\text{-}1}$ through $D_{Ya\text{-}5}$, and $D_{Yb\text{-}1}$ through $D_{Yb\text{-}5}$ are respectively connected to the point electrodes $X_{a\text{-}1}$ through $X_{a\text{-}5}$, $X_{b\text{-}1}$ through $X_{b\text{-}5}$, $Y_{a\text{-}1}$ through $Y_{a\text{-}5}$, and $Y_{b\text{-}1}$ through $Y_{b\text{-}5}$. These diodes $D_{Xa\text{-}1}$ through $D_{Xa\text{-}5}$, $D_{Xb\text{-}1}$ through $D_{Xb\text{-}5}$, $D_{Ya\text{-}1}$ through $D_{Ya\text{-}5}$, and $D_{Yb\text{-}1}$ through $D_{Yb\text{-}5}$ are provided on the glass substrate 1 as the switching elements. More particularly, anodes of the diodes $Q_{Xa\text{-}1}$ through $Q_{Xa\text{-}5}$ are respectively connected to the point electrodes $X_{a\text{-}1}$ through $X_{a\text{-}5}$. Cathodes of the diodes $Q_{Xb\text{-}1}$ through $Q_{Xb\text{-}5}$ are respectively connected to the point electrodes $X_{b\text{-}1}$ through $X_{b\text{-}5}$. Cathodes of the diodes $Q_{Ya\text{-}1}$ through $Q_{Ya\text{-}5}$ are respectively connected to the point electrodes $Y_{a\text{-}1}$ through $Y_{1\text{-}5}$. In addition, anodes of the diodes $Q_{Yb\text{-}1}$ through $Q_{Yb\text{-}5}$ are respectively connected to the point electrodes $Y_{b\text{-}1}$ through $Y_{b\text{-}5}$.

The cathodes of the diodes $D_{Xa\text{-}1}$ through $D_{Xa\text{-}5}$ and the anodes of the diodes $D_{Ya\text{-}1}$ through $D_{Ya\text{-}5}$ are connected to a common line L1 on the glass substrate 1. The common line L1 corresponds to the Vcc line 3b of the first embodiment. This common line L1 is coupled to the power supply voltage Vcc via a switch SW10 and to the ground GND via a switch SW11. On the other hand, the anodes of the diodes $D_{Xb\text{-}1}$ through $D_{Xb\text{-}5}$ and the cathodes of the diodes $D_{Yb\text{-}1}$ through $D_{Yb\text{-}5}$ are connected to a common line L2 on the glass substrate 1. The common line L2 corresponds to the GND line 3a of the first embodiment. This common line L2 is coupled to the power supply voltage Vcc via a switch SW12 and to the ground GND via a switch SW13.

Figure 10:
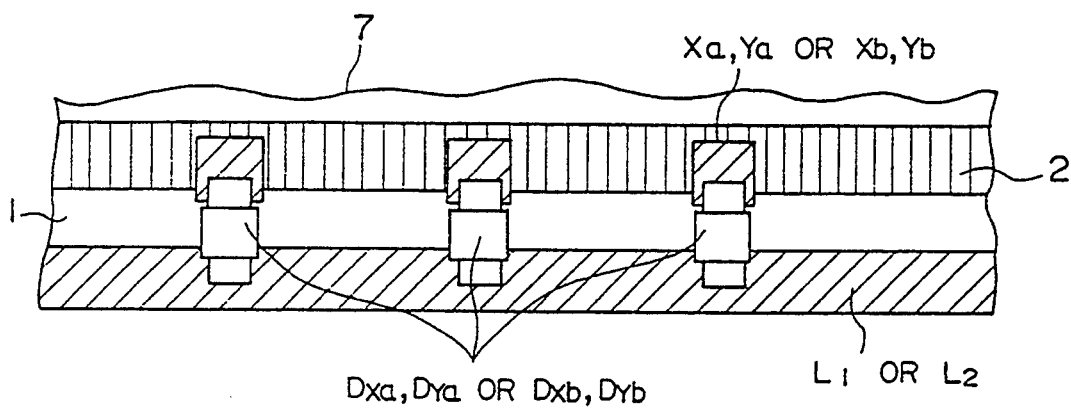
FIG. 10 is a plan view showing an essential part of the third embodiment.
Figure 11:
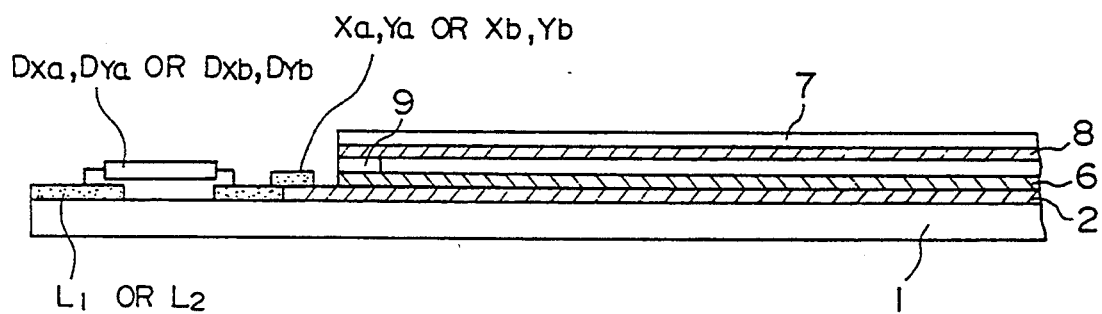
FIG. 11 is a cross sectional view showing an essential part of the third embodiment.

FIG. 10 shows a plan view of an essential part of the third embodiment, and FIG. 11 shows a cross sectional view of an essential part of the third embodiment. In FIGS. 10 and 11, those parts which are the same as those corresponding parts in FIGS. 2 and 3 are designated by the same reference numerals, and a description thereof will be omitted.

As shown in FIGS. 10 and 11, the diodes $D_{Xa-1}$ through $D_{Xa-5}$, $D_{Xb-1}$ through $D_{Xb-5}$, $D_{Ya-1}$ through $D_{Ya-5}$, and $D_{Yb-1}$ through $D_{Yb-5}$ are provided in place of the FETs $Q_{Xa-1}$ through $Q_{Xa-5}$, $Q_{Xb-1}$ through $Q_{Xb-5}$, $Q_{Ya-1}$ through $Q_{Ya-5}$, and $Q_{Yb-1}$ through $Q_{Yb-5}$ of the first embodiment. In addition, no gate lines 4-1 through 4-4 are provided. In this embodiment, the bias directions of the diodes $D_{Xa-1}$ through $D_{Xa-5}$, $D_{Xb-1}$ through $D_{Xb-5}$, $D_{Ya-1}$ through $D_{Ya-5}$, and $D_{Yb-1}$ through $D_{Yb-5}$ are switched in order to switch the connections in the directions X and Y. More particularly, the bias directions are switched by controlling the switches SW10, SW11, SW12 and SW13.

When detecting the X-coordinate position, the switches SW11 and SW12 are turned ON and the switches SW10 and SW13 are turned OFF. As a result, the diodes $D_{Xa-1}$ through $D_{Xa-5}$ and $D_{Xb-1}$ through $D_{Xb-5}$ are forward biased and turned ON. On the other hand, the diodes $D_{Ya-1}$ through $D_{Ya-5}$ and $D_{Yb-1}$ through $D_{Yb-5}$ are reverse biased and turned OFF. Accordingly, a voltage is applied to the resistor layer 2 in the direction X.

On the other hand, when detecting the Y-coordinate position, the switches SW10 and SW13 are turned ON and the switches SW11 and SW12 are turned OFF. As a result, the diodes $D_{Ya-1}$ through $D_{Ya-5}$ and $D_{Yb-1}$ through $D_{Yb-5}$ are forward biased and turned ON. On the other hand, the diodes $D_{Xa-1}$ through $D_{Xa-5}$ and $D_{Xb-1}$ through $D_{Xb-5}$ are reverse biased and turned OFF. Accordingly, a voltage is applied to the resistor layer 2 in the direction Y.

By controlling the switches SW10, SW11, SW12 and SW13 by switching control signals output from the MPU 10, it is possible to control the switching of the diodes $D_{Xa-1}$ through $D_{Xa-5}$, $D_{Xb-1}$ through $D_{Xb-5}$, $D_{Ya-1}$ through $D_{Ya-5}$, and $D_{Yb-1}$ through $D_{Yb-5}$, similarly to the control of the FETs $Q_{Xa-1}$ through $Q_{Xa-5}$, $Q_{Xb-1}$ through $Q_{Xb-5}$, $Q_{Ya-1}$ through $Q_{Ya-5}$, and $Q_{Yb-1}$ through $Q_{Yb-5}$ in the first embodiment.

In this embodiment, the coordinate position ($P_X$, $P_Y$) can be calculated similarly to the first embodiment or the second embodiment described above.

Furthermore, it is possible to detect the coordinate position ($P_X$, $P_Y$) by taking into account the voltage drop introduced at each diode, similarly to the second embodiment described above. In this case, the voltage drop can be taken into consideration by connecting a diode $D_Z$ which is the same as the diodes $D_{Xa-1}$ through $D_{Xa-5}$, $D_{Xb-1}$ through $D_{Xb-5}$, $D_{Ya-1}$ through $D_{Ya-5}$, and $D_{Yb-1}$ through $D_{Yb-5}$ in place of the FET $Q_Z$ in FIG. 8.

Next, a description will be given of a fourth embodiment of the coordinate input apparatus according to the present invention, by referring to FIG. 12. FIG. 12 shows a cross sectional view of an essential part of the fourth embodiment. It is assumed for the sake of convenience that the arrangement shown in FIG. 1 is also used in this embodiment. In FIG. 12, those parts which are the same as those corresponding parts in FIG. 3 are designated by the same reference numerals, and a description thereof will be omitted.

In FIG. 12, an ITO point electrode 106 is provided on the resistor layer 2 at an end of the resistor layer 2. On the other hand, a gate control electrode 107, a power electrode 108 for supplying the power supply voltage Vcc or the ground voltage GND, and a connecting electrode 121 are formed on the PET sheet 7. A conductive adhesive agent 122 connects the point electrode 106 and the connecting electrode 121. In addition, a FET 109 is provided above the gate control electrode 107, the power electrode 108 and the connecting electrode 121. The FET 109 corresponds to one of the FETs $Q_{Xa-1}$ through $Q_{Xa-5}$, $Q_{Xb-1}$ through $Q_{Xb-5}$, $Q_{Ya-1}$ through $Q_{Ya-5}$, and $Q_{Yb-1}$ through $Q_{Yb-5}$ shown in FIG. 1.

As shown in FIG. 12, the point electrode 106 is located at the peripheral part of the resistor layer 2. In addition, the FET 109 is located on the inner side of the touch panel relative to the point electrode 106, as opposed to the first embodiment which has the FET located on the outer side of the touch panel relative to the point electrode.

The opposing substrate body and the glass substrate body which includes the glass substrate 1 may be adhered together similarly to the first embodiment described above. The gate control electrode 107, the power electrode 108 and the connecting electrode 121 are formed on the PET sheet 7 by printing a conductor material such as Ag paste. Lands for connecting drain/source and source/drain of the FET 109 are respectively formed on the connecting electrode 121 and the power electrode 108 by printing or the like. A thermal process is carried out to harden the printed Ag paste or the like and to fix the electrical connections after mounting the FET 109.

According to this embodiment, the FET 109 is provided at the end on top of the PET sheet 7. For this reason, it is possible to reduce the size of the touch panel compared to the first embodiment. In addition, compared to the first embodiment, it is possible to increase the effective input region of the touch panel relative to the size of the touch panel, because the FET 109 is provided above a peripheral region of the touch panel where the equipotential lines are greatly distorted. That is, the FET 109 is provided above the peripheral region of the touch panel other than the effective input region. Furthermore, it is possible to effectively reduce the number of wiring lines which need to be drawn out from the point electrodes because the FET 109 is provided on the opposing substrate body and not on the glass substrate body.

Next, a description will be given of a fifth embodiment of the coordinate input apparatus according to the present invention, by referring to FIG. 13. FIG. 13 shows a cross sectional view of an essential part of the fifth embodiment. It is assumed for the sake of convenience that the arrangement shown in FIG. 9 is also used in this embodiment. In FIG. 13, those parts which are the same as those corresponding parts in FIG. 12 are designated by the same reference numerals, and a description thereof will be omitted.

In this embodiment, a diode 120 is provided in place of the FET 109 shown in FIG. 12. In addition, no gate control electrode 107 is provided. The diode 120 corresponds to one of the diodes $D_{Xa-1}$ through $D_{Xa-5}$, $D_{Xb-1}$ through $D_{Xb-5}$, $D_{Ya-1}$ through $D_{Ya-5}$, and $D_{Yb-1}$ through $D_{Yb-5}$ shown in FIG. 9.

The effects obtainable in this embodiment is basically the same as those obtainable in the fourth embodiment described above.

Next, a description will be given of a sixth embodiment of the coordinate input apparatus according to the present invention, by referring to FIG. 14. FIG. 14 shows a cross sectional view of an essential part of the sixth embodiment. It is assumed for the sake of convenience that the arrangement shown in FIG. 1 is also used in this embodiment. In FIG. 14, those parts which are the same as those corresponding parts in FIG. 12 are designated by the same reference numerals, and a description thereof will be omitted.

In this embodiment, the drain/source of the FET 109 is connected directly to the point electrode 106, and no conductive adhesive agent 122 is used. The effects obtainable in this embodiment is basically the same as those obtainable in the fourth embodiment.

Next, a description will be given of a seventh embodiment of the coordinate input apparatus according to the present invention, by referring to FIG. 15. FIG. 15 shows a cross sectional view of an essential part of the seventh embodiment. It is assumed for the sake of convenience that the arrangement shown in FIG. 9 is also used in this embodiment. In FIG. 15, those parts which are the same as those corresponding parts in FIGS. 13 and 14 are designated by the same reference numerals, and a description thereof will be omitted.

In this embodiment, the diode 120 is provided in place of the FET 109 shown in FIG. 14. In addition, no gate control electrode 107 is provided. The effects obtainable in this embodiment is basically the same as those obtainable in the fourth embodiment.

In the fourth through seventh embodiments, the coordinate detection is carried out similarly to the first and third embodiments described above. Furthermore, it is possible to make a correction by taking into account the voltage drop at each switching element, similarly to the second embodiment described above.

Figure 16:
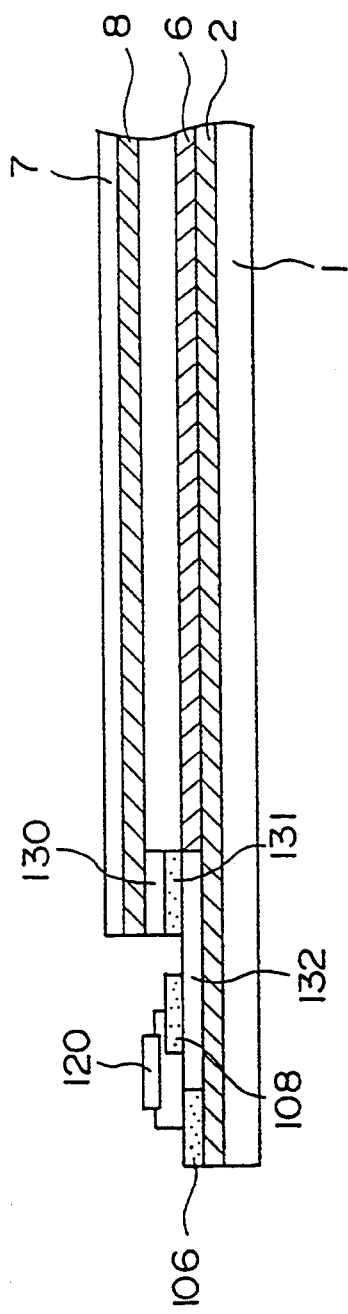
FIG. 16 is a cross sectional view showing an essential part of an eighth embodiment of the coordinate input apparatus according to the present invention.

Next, a description will be given of an eighth embodiment of the coordinate input apparatus according to the present invention, by referring to FIG. 16. FIG. 16 shows a cross sectional view of an essential part of the eighth embodiment. It is assumed for the sake of convenience that the arrangement shown in FIG. 9 is also used in this embodiment. In FIG. 16, those parts which are the same as those corresponding parts in FIG. 13 are designated by the same reference numerals, and a description thereof will be omitted.

In this embodiment, the diode 120 is provided as the switching element. An insulator layer 132 is provided on the resistor layer 2 at the peripheral part of the touch panel, and the power electrode 108 and a detection electrode 131 are provided on this insulator layer 132.

The opposing substrate body is adhered on the glass substrate body by a conductive bonding agent 130 via the detection electrode 131. Hence, the connection electrode and the power electrode do not need to be printed on the opposing substrate body, thereby simplifying the assembling process of the coordinate input apparatus. As in the case of the fourth through seventh embodiments, the diode 120 is located on the inner side of the touch panel relative to the point electrode 106, as opposed to the first embodiment which has the FET located on the outer side of the touch panel relative to the point electrode. Hence, it is possible to reduce the size of the touch panel.

Figure 17:
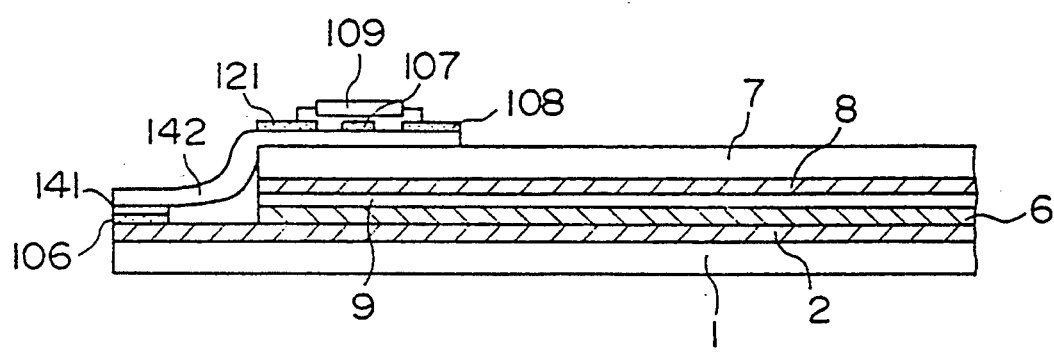
FIG. 17 is a cross sectional view showing an essential part of a ninth embodiment of the coordinate input apparatus according to the present invention.

Next, a description will be given of a ninth embodiment of the coordinate input apparatus according to the present invention, by referring to FIG. 17. FIG. 17 shows a cross sectional view of an essential part of the ninth embodiment. It is assumed for the sake of convenience that the arrangement shown in FIG. 1 is also used in this embodiment. In FIG. 17, those parts which are the same as those corresponding parts in FIG. 12 are designated by the same reference numerals, and a description thereof will be omitted.

In this embodiment, a flexible printed circuit 142 is provided. One end of this flexible printed circuit 142 is connected to the point electrode 106 via a conductive adhesive agent 141, and the other end of this flexible printed circuit 142 is connected to the PET sheet 7. The gate control electrode 107, the power electrode 108 and the connecting electrode 121 are provided on the flexible printed circuit 142 above the PET sheet 7.

The effects obtainable in this embodiment is basically the same as those obtainable in the fourth embodiment described above. In addition, the provision of the flexible printed circuit 142 facilitates the necessary electrical connections, and positive electrical connections can be made without reducing the effective input region of the touch panel.

Figure 18:
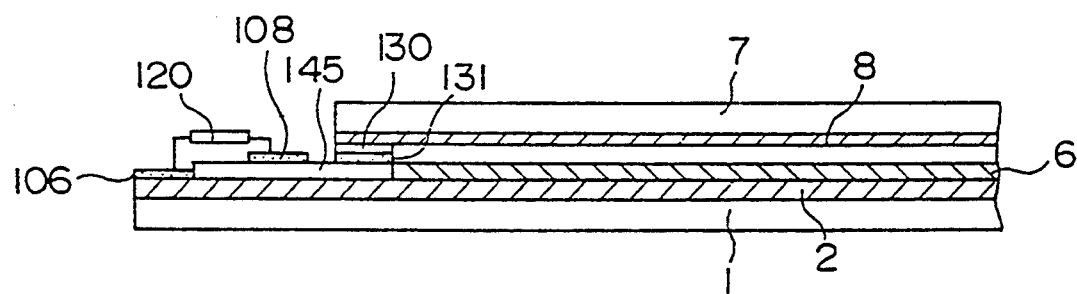
FIG. 18 is a cross sectional view showing an essential part of a tenth embodiment of the coordinate input apparatus according to the present invention.

Next, a description will be given of a tenth embodiment of the coordinate input apparatus according to the present invention, by referring to FIG. 18. FIG. 18 shows a cross sectional view of an essential part of the tenth embodiment. It is assumed for the sake of convenience that the arrangement shown in FIG. 9 is also used in this embodiment. In FIG. 18, those parts which are the same as those corresponding parts in FIG. 16 are designated by the same reference numerals, and a description thereof will be omitted.

In this embodiment, a flexible printed circuit 145 is provided in place of the insulator layer 132 shown in FIG. 16.

The effects obtainable in this embodiment is basically the same as those obtainable in the fifth and eighth embodiments described above. In addition, the provision of the flexible printed circuit 145 facilitates the necessary electrical connections, and positive electrical connections can be made without reducing the effective input region of the touch panel.

In the eighth through tenth embodiments, the coordinate detection is carried out similarly to the first and third embodiments described above. Furthermore, it is possible to make a correction by taking into account the voltage drop at each switching element, similarly to the second embodiment described above.

Figure 19:
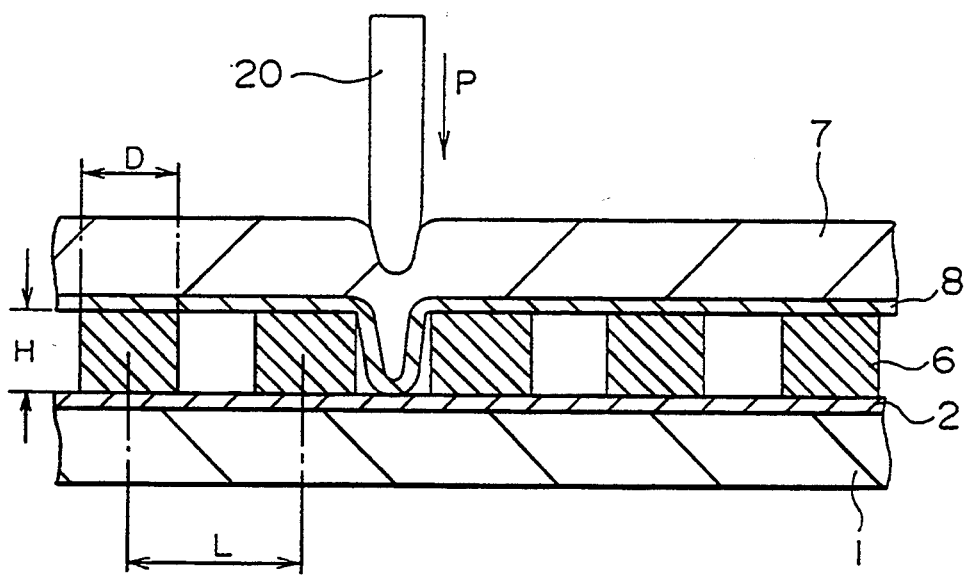
FIG. 19 is a cross sectional view showing an effective input region of the touch panel for explaining problems encountered in realizing electrical contact between the conductor layer and the resistor layer.
Figure 20:
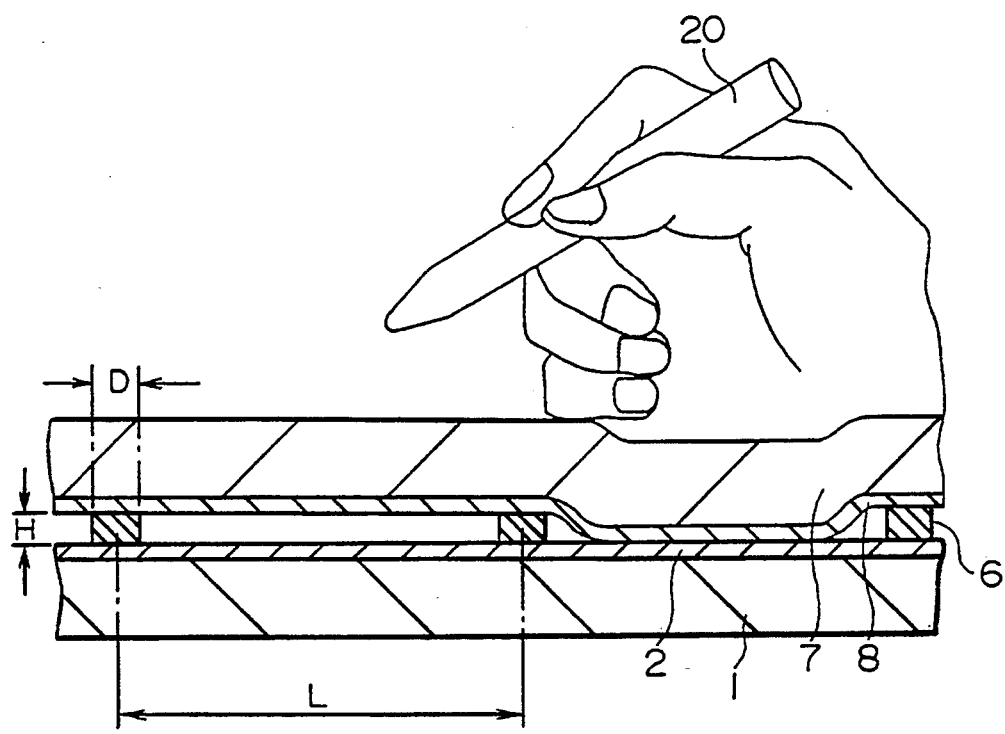
FIG. 20 is a cross sectional view showing an effective input region of the touch panel for explaining problems encountered in realizing electrical contact between the conductor layer and the resistor layer.

Next, a description will be given of the construction of the touch panel in the effective input region, by referring to FIGS. 19 and 20. In FIGS. 19 and 20, those parts which are the same as those corresponding parts in FIGS. 1 through 3 are designated by the same reference numerals, and a description thereof will be omitted.

As may be seen from FIG. 19, if a pitch L of the spacer pieces forming the spacer layer 6 is too small, a width D of the spacer pieces forming the spacer layer 6 is too large relative to the pitch L, or a thickness (or height) H of the spacer layer 6 is too large, the electrical contact between the conductor layer 8 and the resistor layer 2 cannot be made unless the pen 20 applies a large pressure P on the PET sheet 7.

On the other hand, as may be seen from FIG. 20, if the pitch L is too large, the width D is too small relative to the pitch L, or the thickness H is too small, the electrical contact between the conductor layer 8 and the resistor layer 2 even if the pressure applied on the PET sheet is small, such as the case where the operator's hand rests on the PET sheet 7. But if the electrical contact between the conductor layer 8 and the resistor layer 2 is made even if the pressure applied on the PET sheet 7 is small, an erroneous input may easily occur when the top surface of the PET sheet 7 is simply touched.

Accordingly, if the pitch, thickness, arrangement and the like of the spacer layer 6 are not appropriately set, a large pressure P must be applied on the PET sheet 7 by the pen 20. However, such a large pressure P may damage or break the touch panel, and the serviceable life of the touch panel is shortened. On the other hand, if the pitch, thickness, arrangement and the like of the spacer layer 6 are not appropriately set and the electrical contact between the conductor layer 8 and the resistor layer 2 occurs even by a small pressure applied on the PET sheet 7, an erroneous input is easily generated, and the reliability of the coordinate input apparatus becomes poor.

Therefore, the spacer layer 6 greatly affects the performance and reliability of the touch panel. In other words, the width, thickness (or height), pitch, arrangement and the like of the spacer layer 6 greatly affects the amount of bend of the conductor layer 8 and the PET sheet 7. For this reason, the spacer layer 6 must be arranged under appropriate conditions so that desired performance and reliability of the touch panel are guaranteed.

The U.S. Pat. No. 3,911,215 teaches the need to set arrange the spacer layer under appropriate conditions. However, this U.S. Patent merely determines the arrangement of the spacer layer by taking into consideration the radius of curvature of the tip end of the pen. Hence, no consideration is given as to the pressure applied on the touch panel by the pen, and no solutions are suggested for overcoming the problems described above in conjunction with FIGS. 19 and 20.

Figure 21:
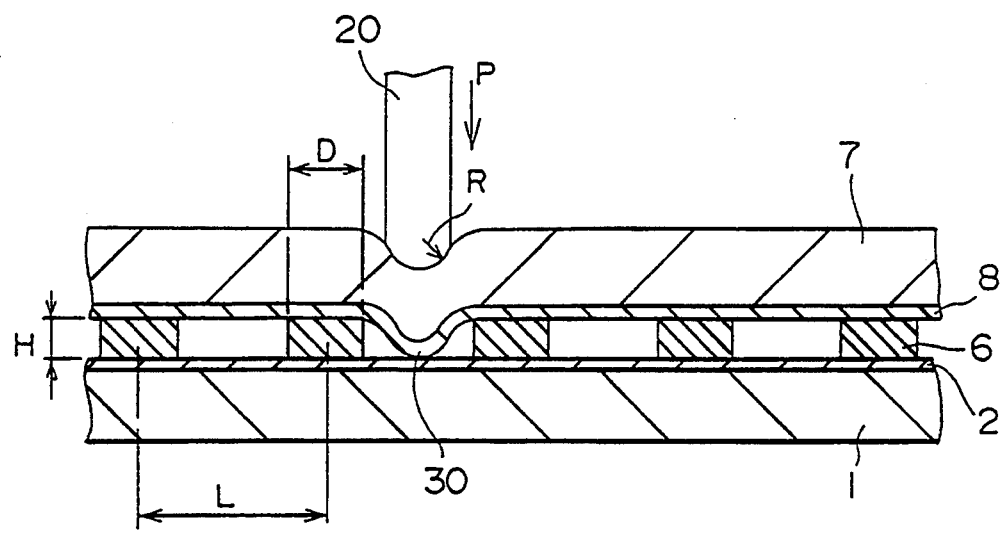
FIG. 21 is a cross sectional view showing an essential part of an eleventh embodiment of the coordinate input apparatus according to the present invention in a state where a pressure is applied on the touch panel.
Figure 22:
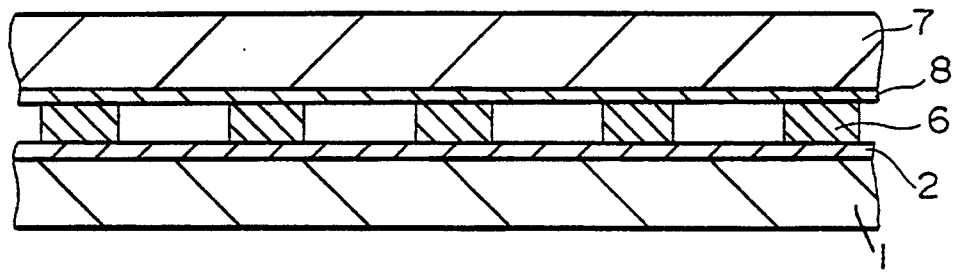
FIG. 22 is a cross sectional view showing the essential part of the eleventh embodiment in the sleep mode.

Next, a description will be given of an eleventh embodiment of the coordinate input apparatus according to the present invention, in which the problems described in conjunction with FIGS. 19 and 20 are eliminated. FIG. 21 shows a cross sectional view of an essential part of the eleventh embodiment in a state where a pressure is applied on the touch panel and the conductor layer 8 and the resistor layer 2 make electrical contact at a position 30. FIG. 22 shows a cross sectional view of the essential part of the eleventh embodiment in the sleep mode. In FIGS. 21 and 22, those parts which are the same as those corresponding parts in FIGS. 1 through 3 are designated by the same reference numerals, and a description thereof will be omitted.

In this embodiment, parameters related to the spacer layer 6 satisfy the following relationship (5), where H (mm) denotes the thickness (or height) of the spacer layer 6, P (g) denotes the input pressure applied on the PET sheet 7 by the tip of the pen 20 in order to make electrical contact between the conductor layer 8 and the resistor layer 2, L (mm) denotes the pitch of the spacer pieces forming the spacer layer 6, and $\alpha$ denotes a ratio of the area occupied by the spacer pieces with respect to the area of the conductor layer 8. The input pressure P is defined as the pressure which is applied in a direction perpendicular to the top horizontal surface of the PET sheet 7, and with which the conductor layer 8 makes electrical contact with the resistor layer 2.

$$0.04 \leq H/(P \times L^4 \times \alpha) \leq 0.3 \qquad (5)$$

For example, the spacer pieces of the spacer layer 6 has a width D=50 μm, a pitch L=350 μm, and a thickness (or height) H=5.7 μm. In addition, a radius of curvature R of the tip end of the pen 20 is approximately 0.5 mm to 2.0 mm, and the applied input pressure P=158 g.

The peripheral part of the touch panel, including the switching elements, may be formed according to any one of the first through tenth embodiments described above, for example.

Figure 23:
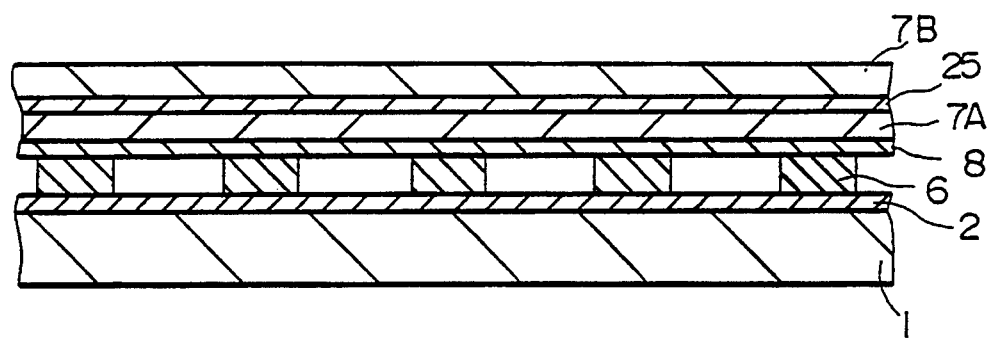
FIG. 23 is a cross sectional view showing an essential part of a twelfth embodiment of the coordinate input apparatus according to the present invention in the sleep mode.

Next, a description will be given of a twelfth embodiment of the coordinate input apparatus according to the present invention, in which the problems described in conjunction with FIGS. 19 and 20 are also eliminated. FIG. 23 shows a cross sectional view of an essential part of the twelfth embodiment in the sleep mode. In FIG. 23, those parts which are the same as those corresponding parts in FIGS. 1 through 3 are designated by the same reference numerals, and a description thereof will be omitted.

In this embodiment, the PET sheet part which is provided on the conductor layer 8 has a multi-layer structure. More particularly, a first PET sheet 7A is provided on the conductor layer 8, an intermediate layer 25 is provided on the first PET sheet 7A, and a second PET sheet 7B is provided on the intermediate layer 25. An anti-reflection coating or the like which may be provided is not regarded as a layer forming the multi-layer structure. Of course, the PET sheet part having the multi-layer structure may include more than two PET sheets.

In this embodiment, parameters related to the spacer layer 6 satisfy the following relationship (6), where H (mm) denotes the thickness (or height) of the spacer layer 6, P (g) denotes the input pressure applied on the PET sheet 7 by the tip of the pen 20 in order to make electrical contact between the conductor layer 8 and the resistor layer 2, L (mm) denotes the pitch of the spacer pieces forming the spacer layer 6, and $\alpha$ denotes a ratio of the area occupied by the spacer pieces with respect to the area of the conductor layer 8. The input pressure P is defined as the pressure which is applied in a direction perpendicular to the top horizontal surface of the second PET sheet 7B, and with which the conductor layer 8 makes electrical contact with the resistor layer 2.

$$0.3 \leq H/(P \times L^4 \times \alpha) \leq 0.8 \qquad (6)$$

For example, the spacer pieces of the spacer layer 6 has a width D=50 μm, a pitch L=150 μm, and a thickness (or height) H=2.4 μm. In addition, a radius of curvature R of the tip end of the pen 20 is approximately 0.5 mm to 2.0 mm, and the applied pressure P=93 g.

The peripheral part of the touch panel, including the switching elements, may be formed according to any one of the first through tenth embodiments described above, for example.

Figure 24:
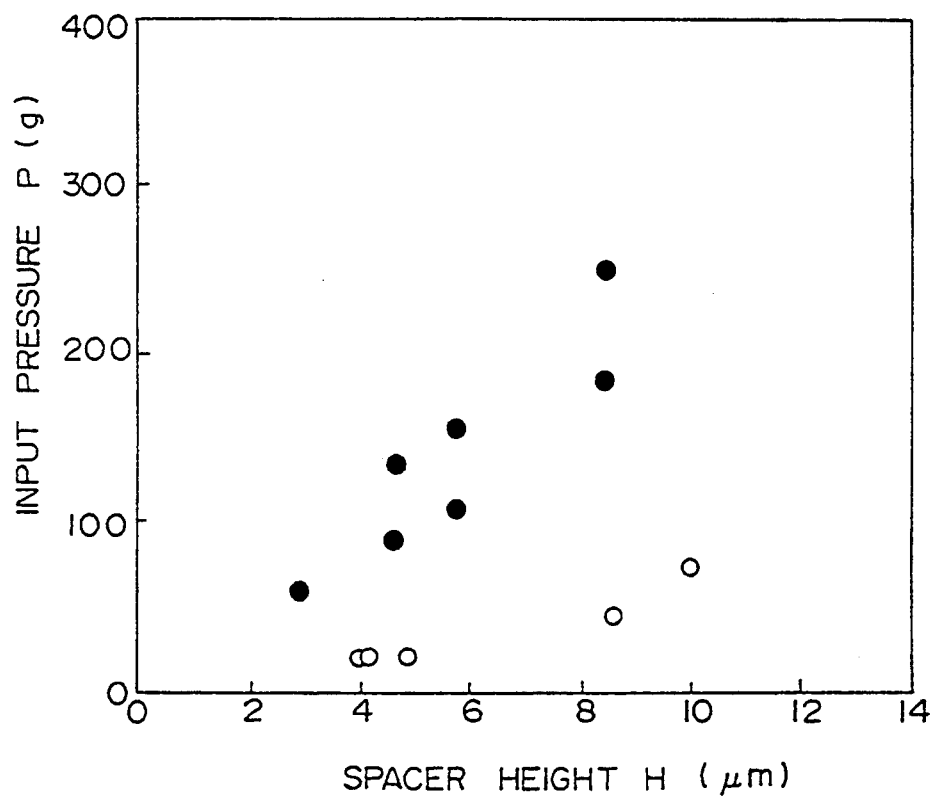
FIG. 24 shows measured results of input pressures applied on the touch panel with respect to various thicknesses (or heights) of spacer pieces forming a spacer layer with other parameters related to the spacer layer kept constant.
Figure 25:
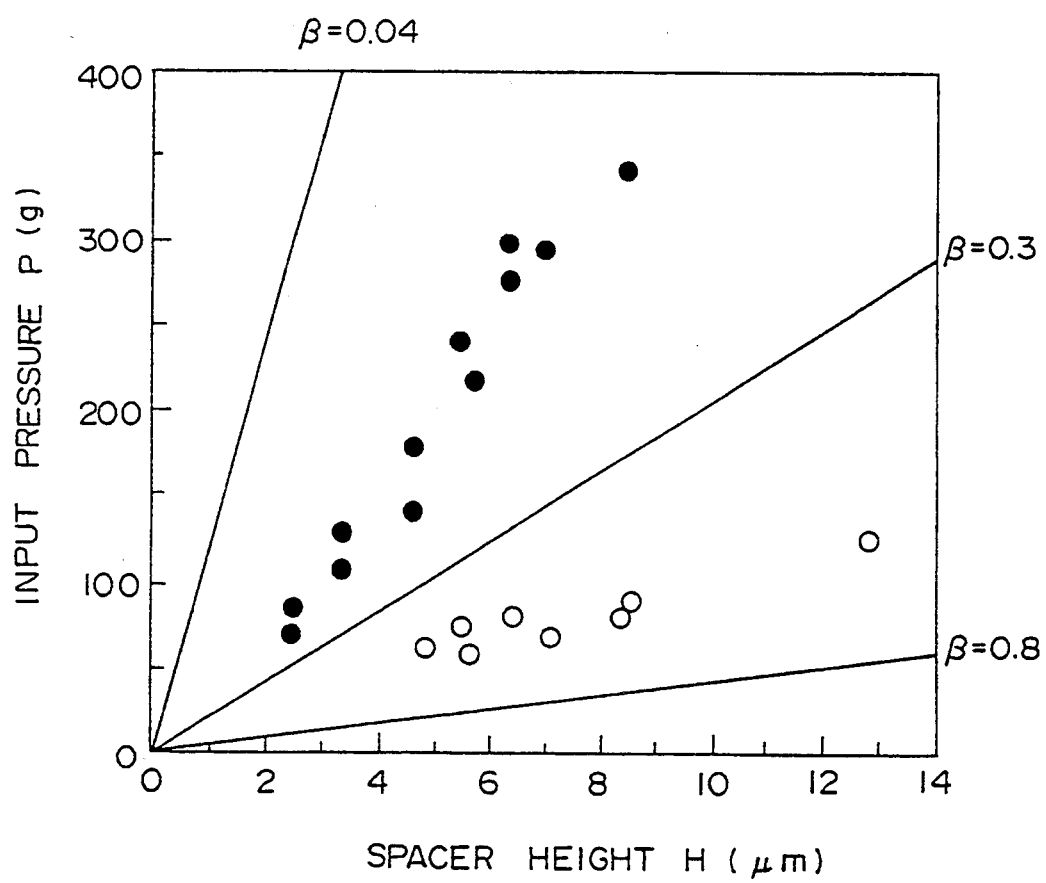
FIG. 25 shows measured results of input pressures applied on the touch panel with respect to various thicknesses (or heights) of spacer pieces forming the spacer layer with the width and pitch of the spacer pieces set to first values.
Figure 26:
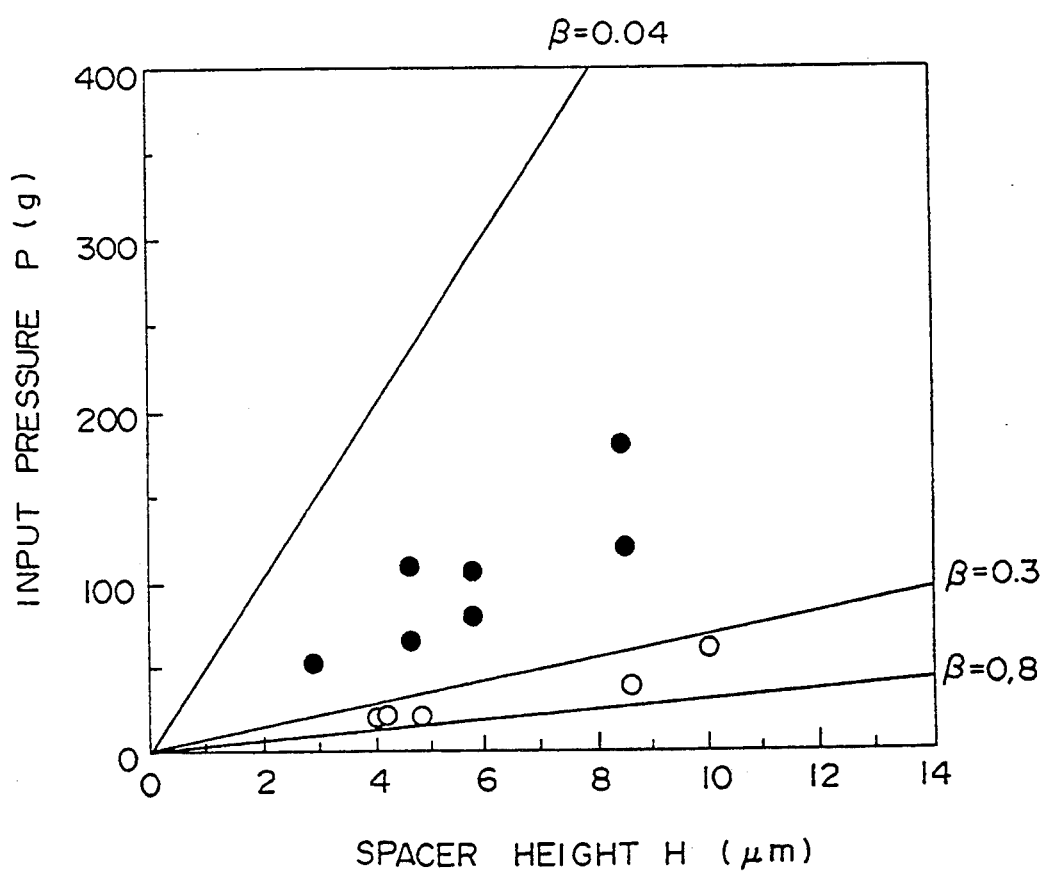
FIG. 26 shows measured results of input pressures applied on the touch panel with respect to various thicknesses (or heights) of spacer pieces forming the spacer layer with the width and pitch of the spacer pieces set to second values.

FIG. 24 shows measured results of input pressures applied on the touch panel with respect to various thicknesses (or heights) of spacer pieces forming the spacer layer with other parameters related to the spacer layer kept constant. In other words, the required input pressure P was measured for various touch panels having spacer layers with different thicknesses (or heights). In FIG. 24 and FIGS. 25 and 26 which will be described later, the data indicated by black circular marks were obtained for the touch panel having the single-PET-sheet structure shown in FIGS. 21 and 22, and the data indicated by white circular marks were obtained for the touch panel having the double-PET-sheet structure shown in FIG. 23. The relationships (5) and (6) for the eleventh and twelfth embodiments were approximated based on the measured results shown in FIG. 24.

In approximating the relationships (5) and (6), the thickness (or height) H (mm) and the pitch L (mm) of the spacer pieces forming the spacer layer 6, the ratio $\alpha$ of the area occupied by the spacer pieces with respect to the area of the conductor layer 8, and a mechanical characteristic $\beta$ (1/gmm$^3$) were considered as the factors affecting the input pressure P (g) which is required to make electrical contact between the conductor layer 8 and the resistor layer 2. The mechanical characteristic $\beta$ is related to the contact area of the pen 20 relative to the PET sheet 7 or 7B and to the structure of the PET sheet part of the touch panel.

It was assumed that the above parameters satisfy a formula $H = P \times L^4 \times \alpha \times \beta$, and an approximation was made based on experiments which were conducted. It was found that the mechanical characteristic $\beta$ generally takes a value in a range $0.04 \leq \beta \leq 0.8$. In addition, it was found that the mechanical characteristic $\beta$ takes a value in a range $0.04 \leq \beta \leq 0.3$ for the eleventh embodiment shown in FIGS. 21 and 22, and that the mechanical characteristic $\beta$ takes a value in a range $0.3 \leq \beta \leq 0.8$ for the twelfth embodiment shown in FIG. 23.

Compared to the case where the PET sheet part has the single-PET-sheet structure (eleventh embodiment), the required input pressure P is smaller in the case of the PET sheet part having the double-PET-sheet structure (twelfth embodiment). It may be regarded that the smaller input pressure P is obtained for the double-PET-sheet structure because the provision of the intermediate layer 25 between the first and second PET sheets 7A and 7B realizes a more flexible PET sheet part.

The validity of the above described relationships of the parameters related to the spacer layer 6 were inspected by making touch panels having various parameters related to the spacer layer 6 and evaluating the input pressure required to realize the electrical contact between the conductor layer 8 and the resistor layer 2.

FIG. 25 shows measured results of pressures applied on the touch panel with respect to various thicknesses (or heights) of spacer pieces forming the spacer layer 6 with the width D and the pitch L of the spacer pieces respectively set to 50 μm and 250 μm. As may be seen from FIG. 25, the mechanical characteristic $\beta$ generally takes a value in a range $0.04 \leq \beta \leq 0.8$.

On the other hand, FIG. 26 shows measured results of pressures applied on the touch panel with respect to various thicknesses (or heights) of spacer pieces forming the spacer layer 6 with the width D and the pitch L of the spacer pieces respectively set to 50 μm and 450 μm. As may be seen from FIG. 26, the mechanical characteristic $\beta$ generally takes a value in a range $0.04 \leq \beta \leq 0.8$.

Experiments were made under other conditions with the parameters related to the spacer layer 6 set to different values. However, the results of the experiments all showed that the mechanical characteristic $\beta$ generally takes a value in a range $0.04 \leq \beta \leq 0.8$.

Furthermore, the results of the experiments showed that the mechanical characteristic $\beta$ takes a value in a range $0.04 \leq \beta \leq 0.3$ when the PET sheet part has the single-PET-sheet structure shown in FIGS. 21 and 22, and that the mechanical characteristic $\beta$ takes a value in a range $0.3 \leq \beta \leq 0.8$ for the double-PET-sheet structure shown in FIG. 23. Therefore, it was confirmed that the above described relationships (5) and (6) respectively are appropriate for the eleventh and twelfth embodiments.

In the experiments which were conducted, the pen 20 used was made of polyacetal resin. And, when the radius of curvature R of the tip end of the pen 20 was 2 mm or greater, the tip end was too fat and it was difficult to detect the contact position. On the other hand, when the radius of curvature R of the tip end of the pen 20 was 0.5 mm or less, the tip end was too thin and there was a possibility of scratching and damaging 10 the PET sheet 7 or 7B. For these reasons, it was found desirable to set the radius of curvature R of the tip end of the pen 20 within the range of 0.5 mm to 2.0 mm.

Figure 27:
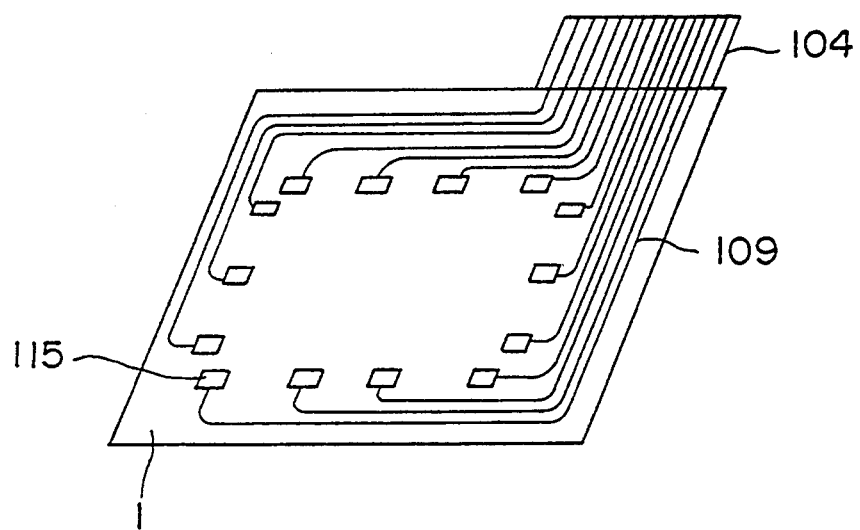
FIG. 27 is a perspective view showing wiring lines connected to the point electrodes of the coordinate input apparatus.

Next, a description will be given of the wiring lines connected to the point electrodes of the coordinate input apparatus. As shown in FIG. 27, point electrodes 115 and wiring patterns 109 are usually provided on the glass substrate 1 by printing a conductor paste such as Ag paste. In this case, in order to make the resistance of the wiring pattern 109 from the point electrode 115 to a connector part 104 negligible, the width of the draw-out lines must be made large on the order of 1 mm because the resistance of the conductor paste per unit area is large. As a result, the peripheral part of the touch panel is used up by the wiring patterns 109 and the area of the effective input region of the touch panel is reduced, thereby making it difficult to reduce the overall size of the touch panel, that is, the coordinate input apparatus.

It is conceivable to stack a plurality of conductor paste layers and insulator layers in an alternate manner, so as to reduce the area of the wiring patterns occupying the peripheral part of the touch panel. However, the stacking of these layers complicates the production process, thereby deteriorating the yield and increasing the production cost. In addition, the possibility of a short-circuit increases due to insufficient coverage of the conductor layer by the insulator layer, and if this should occur, the quality and reliability of the coordinate input apparatus would deteriorate.

On the other hand, the resistances of the resistor layer 2 and the conductor layer 8 are in general inconsistent among individual pieces due to causes generated during the production process. Therefore, the coordinate input apparatus becomes very expensive if a highly accurate coordinate detection is to be guaranteed by using the resistor layer 2 and the conductor layer 8 which have exactly desired (or designed) resistances.

Alternatively, the X-coordinate data and the Y-coordinate data must be corrected in order to guarantee the highly accurate coordinate detection. For example, a method of correcting the X-coordinate data and the Y-coordinate data is proposed in a Japanese Laid-Open Patent Application No. 63-46531.

The proposed data correction is made by sectioning the resistor or conductor layer into regions because the resistance is not uniform on the surface and is inconsistent depending on the location on the surface. A judgement is made to determine the region to which the detected coordinate belongs. Since the non-uniform resistance occurs two-dimensionally, the detected coordinate (X, Y) is corrected to obtain a corrected coordinate (x, y) by carrying out an affine transformation using transformation parameters of the region which is detected as a result of the judgement. The affine transformation can be described by the following formulas (7), where X and Y denote actually measured values, x and y denote ideal (or corrected) values, and A, B, C, D, E and F denote correction parameters. The correction parameters A through F are obtained for each region based on the actually measured values, and are stored in a memory.

$$x = AX + BY + C$$

$$y = DX + EY + F \qquad (7)$$

Conventionally, the memory is provided on a circuit control substrate together with the A/D converter and the MPU. However, since the resistance of the conductor or resistor layer differs for each individual touch panel, the data correction must be made after assembling each touch panel to a common circuit which is provided on the control substrate and is used in common for all touch panels. As a result, the troublesome and time consuming data correction process must be made before delivery of the input coordinate apparatus. In addition, the data correction must be carried out again if the touch panel or the common circuit is to be changed for some reason.

Figure 28:
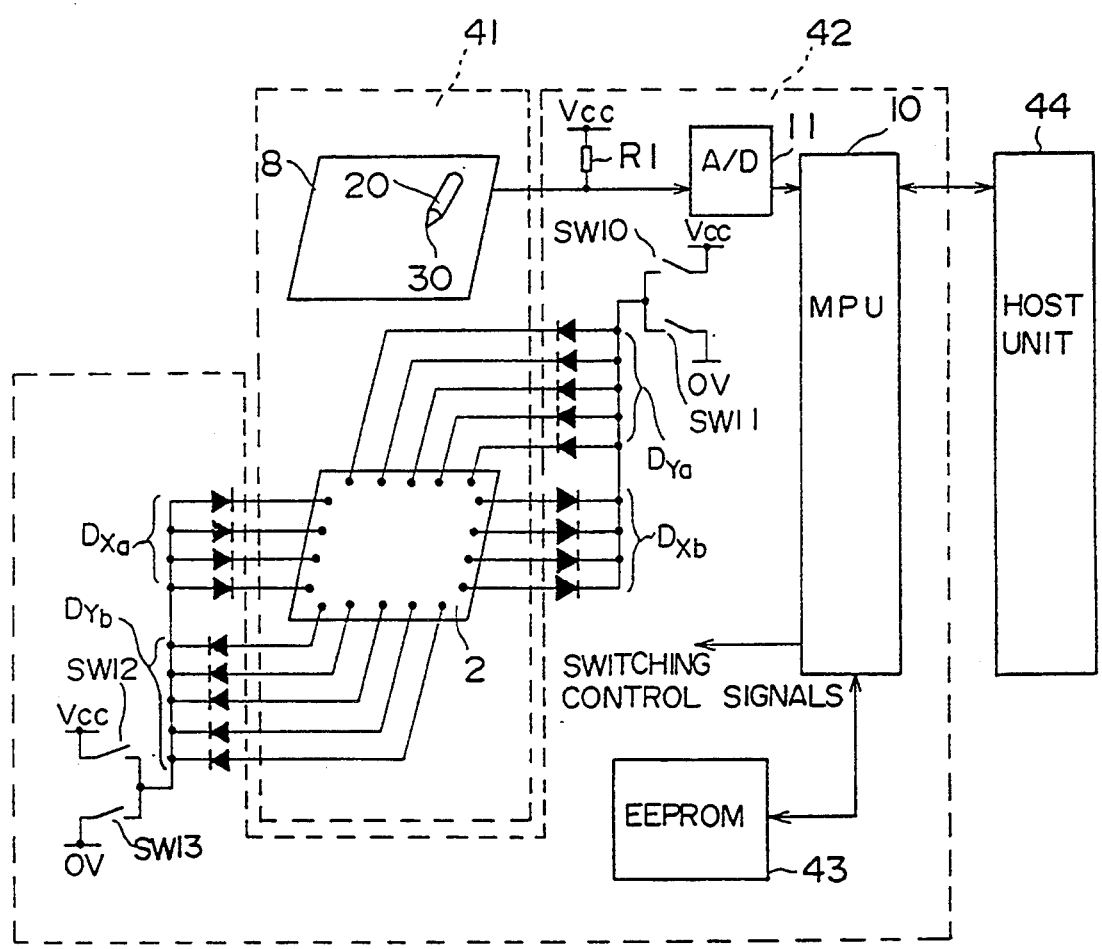
FIG. 28 generally shows a thirteenth embodiment of the coordinate input apparatus according to the present invention.

Next, a description will be given of a thirteenth embodiment of the coordinate input apparatus according to the present invention, in which the above described problems are eliminated. FIG. 28 generally shows an essential part of the thirteenth embodiment. In FIG. 28, those parts which are the same as those corresponding parts in FIG. 9 are designated by the same reference numerals, and a description thereof will be omitted.

In FIG. 28, a touch panel 41 and a control circuit 42 are electrically connected via a flexible printed circuit 124 which will be described later in conjunction with FIG. 29. In addition, an electrically erasable programmable read only memory (EEPROM) 43 is connected to the MPU 10 of the control circuit 42. The MPU 10 of the control circuit 42 is coupled to a host unit 44. Of course, FETs may be used as the switching elements in place of the diodes $D_{Xa}$, $D_{Xb}$, $D_{Ya}$ and $D_{Yb}$.

Figure 29:
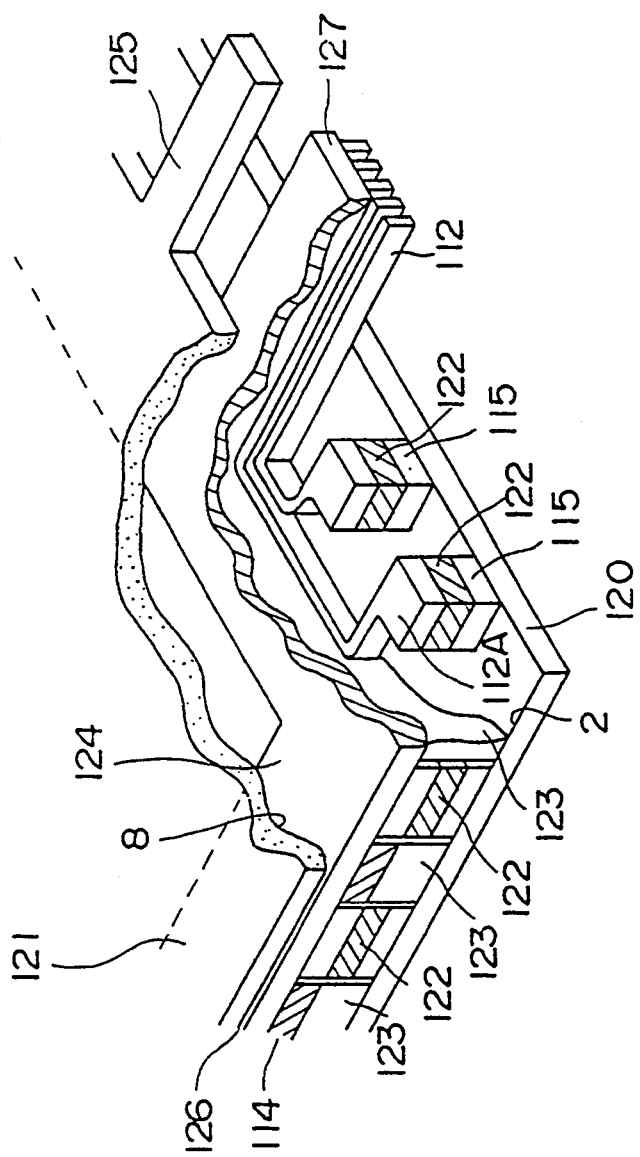
FIG. 29 is a perspective view, with a part cut away, showing an essential part of the thirteenth embodiment in a vicinity of the touch panel.

FIG. 29 is a perspective view, with a part cut away, showing an essential part of the thirteenth embodiment in a vicinity of the touch panel 41. In this embodiment, a glass substrate 120 has the resistor layer 2 formed on the top surface thereof. Point electrodes 115 are provided on the peripheral part of the resistor layer 2 of the glass substrate 120.

Metal wiring lines 112 are printed on the bottom surface of the flexible printed circuit 124 which has a frame shape. An opening formed at the central part of the flexible printed circuit 124 substantially corresponds to the effective input region of the touch panel 41. For example, the flexible printed circuit 124 has wiring patterns printed on a polyimide resin plate. Pads 112A are provided at ends of the metal wiring lines 112 at positions corresponding to the positions of the point electrodes 115. The metal wiring lines 112 are isolated from each other by insulator layers 114. The flexible printed circuit 124 is adhered on the glass substrate 120 by adhering each pad 112A of the metal wiring line 112 to the corresponding point electrode 115 via an anisotropic conductive adhesive agent 122, adhering the insulator layer 114 to the resistor layer 2 of the glass substrate 120 via an adhesive agent 123, and subjecting this structure to a thermal process.

On the other hand, a PET sheet 121 has the conductor layer 8 formed on the bottom surface thereof. The conductor layer 8 of the PET sheet 121 is adhered on the top surface of the flexible printed circuit 124 via an adhesive agent 126. The PET sheet 121 has a draw-out part 125 which projects to the outer side. The flexible printed circuit 124 has a draw-out part 127 at a position corresponding to the draw-out part 125 of the PET sheet 121, for drawing out the metal wiring lines 112 outside the touch panel 41. In FIG. 29 and the subsequent drawings, the illustration of the spacer layer is omitted for the sake of convenience.

As shown in FIG. 30, the equipotential lines generated on the resistor layer 2 when a voltage is applied to the point electrodes 115 are distorted in the vicinity of the point electrodes 115, regardless of whether or not the resistance of the resistor layer 2 is uniformly distributed. In FIG. 30, an enlarged view I shows the equipotential lines which are generated when the voltage is applied in the direction Y, and an enlarged view II shows the equipotential lines which are generated when the voltage is applied in the direction X. Therefore, the peripheral part of the touch panel 41 in the vicinities of the point electrodes 115 cannot be used as the effective input region of the touch panel 41. This embodiment effectively utilizes the peripheral part of the touch panel 41 which is not used as the effective input region of the touch panel 41. More particularly, the flexible printed circuit 124 has the frame shape corresponding to the peripheral part of the touch panel 41, and is provided at the peripheral part of the touch panel. In other words, this embodiment effectively utilizes the dead space of the touch panel 41.

FIG. 31 shows a disassembled perspective view of the touch panel 41. As shown in FIG. 31, the flexible printed circuit 124 is sandwiched between the conductor layer 8 of the PET sheet 121 and the resistor layer 2 of the glass substrate 120.

Figure 32:
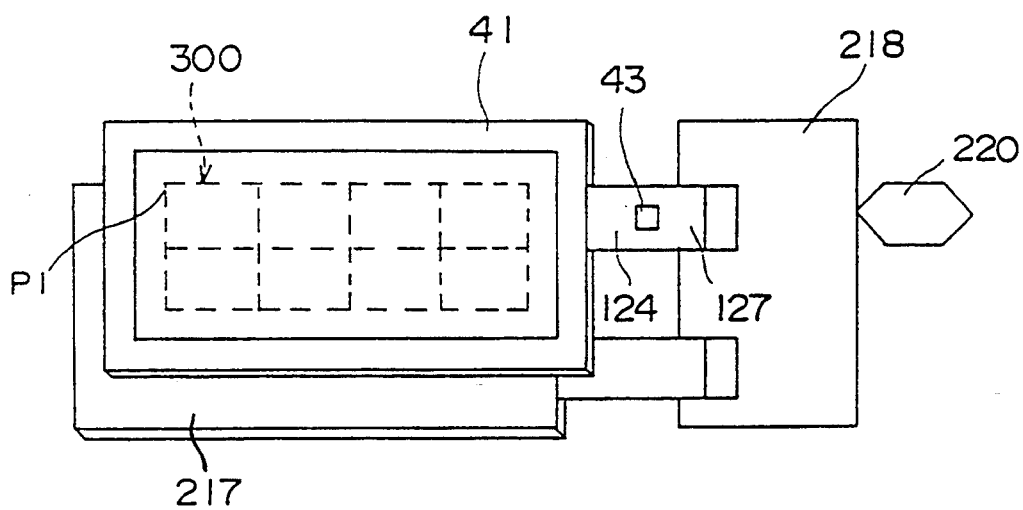
FIG. 32 is a diagram for explaining the construction of the touch panel of the thirteenth embodiment.

As shown in FIG. 32, a liquid crystal display (LCD) 217 may be provided under the touch panel 41, provided that the touch panel 41 is transparent. In this case, it is possible to integrate the input and display. In FIG. 32, the illustration of the PET sheet 121 is omitted. The EEPROM 43 is provided on the draw-out part 127 of the flexible printed circuit 124, and the metal wiring lines 112 (not shown in FIG. 32) connect to a circuit control substrate 218 via the draw-out parts 125 and 127. The MPU 10, the A/D converter 11 and the like shown in FIG. 28 are provided on the circuit control substrate 218, and this circuit control substrate 218 forms the control circuit 42 together with the EEPROM 43. The circuit control substrate 218 is coupled to the host unit 44 via an external interface 220.

In FIG. 32, the coordinate input is made by pressing a point within the effective input region of the touch panel 41 by the pen 20. An effective input region 300 on the resistor layer 2 corresponds to this effective input region of the touch panel 41. However, in general, the resistance on the surface of the resistor layer 2 and/or the conductor layer 8 is not uniform due to inconsistencies introduced during the production process. Hence, a correction process must be carried out for each touch panel 41 before delivery, so as to write the obtained correction parameters into the EEPROM 43.

Figure 33:
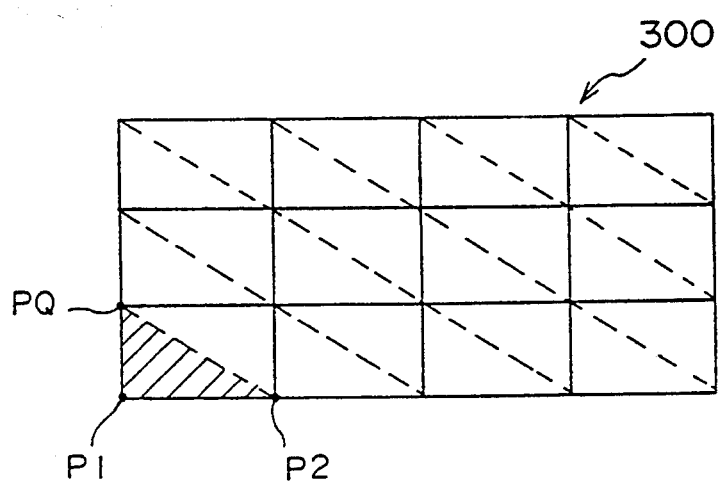
FIG. 33 is a diagram for explaining division of the effective input region.

In this embodiment, the correction process is carried out as follows. That is, since the resistance on the surface of the resistor layer 2 is not uniform, the effective input region 300 is divided into a plurality of regions as shown in FIG. 33, and a judgement is made to determine the region to which a detected coordinate (X, Y) belongs. The non-uniform resistance occurs two-dimensionally, the detected coordinate (X, Y) is corrected to obtain a corrected coordinate (x, y) by carrying out an affine transformation using transformation parameters of the region which is detected as a result of the judgement. The affine transformation can be described by the formulas (7) described above. The correction parameters A through F are obtained for each region based on the actually measured values, and are stored in the EEPROM 43.

In other words, the correction parameters A through F are obtained for each of the 24 divided regions shown in FIG. 33 based on the actually measured values. For the sake of convenience, a description will be given of a case where the correction parameters A through F are obtained for a triangular divided region which is indicated by the hatching and has apexes P0, P1 and P2. The following simultaneous equations (8) through (10) stand if the actually measured values and ideal values of the 3 points P0, P1 and P2 are substituted into the actually measured values (X, Y) and the ideal values (x, y) in the formulas (7) described above. In the simultaneous equations (8) through (10), (X0, Y0) and (x0, y0) respectively denote the actually measured values and the ideal values at the point P0, (X1, Y1) and (x1, y1) respectively denote the actually measured values and the ideal values at the point P1, and (X2, Y2) and (x2, y2) respectively denote the actually measured values and the ideal values at the point P2.

$$x0 = AX0 + BY0 + C$$
$$y0 = DX0 + EY0 + F \quad (8)$$
$$x1 = AX1 + BY1 + C$$
$$y1 = DX1 + EY1 + F \quad (9)$$
$$x2 = AX2 + BY2 + C$$
$$y2 = DX2 + EY2 + F \quad (10)$$

The correction parameters A through F can be obtained by carrying out a reverse operation based on the above simultaneous equations (8) through (10).

Before delivery of the touch panel 41, the correction process is started by pressing correction data input points Pi on the touch panel 41 by the pen 20, for i=1 to i=15 in FIG. 32. Then, after temporarily storing all of the actually measured values in the EEPROM 43 or an internal memory (not shown), the correction calculation is carried out for the 24 divided regions shown in FIG. 33. The correction parameters A through F are thus obtained for each of the 24 divided regions and are stored in the EEPROM 43. The correction parameters A through F stored in the EEPROM 43 will not be erased even if the power supply is cut off. Hence, it is always possible to correct the non-linear characteristic (or relationship) between the actually input coordinate and the detected coordinate based on the correction parameters A through F stored in the EEPROM 43.

Figure 34:
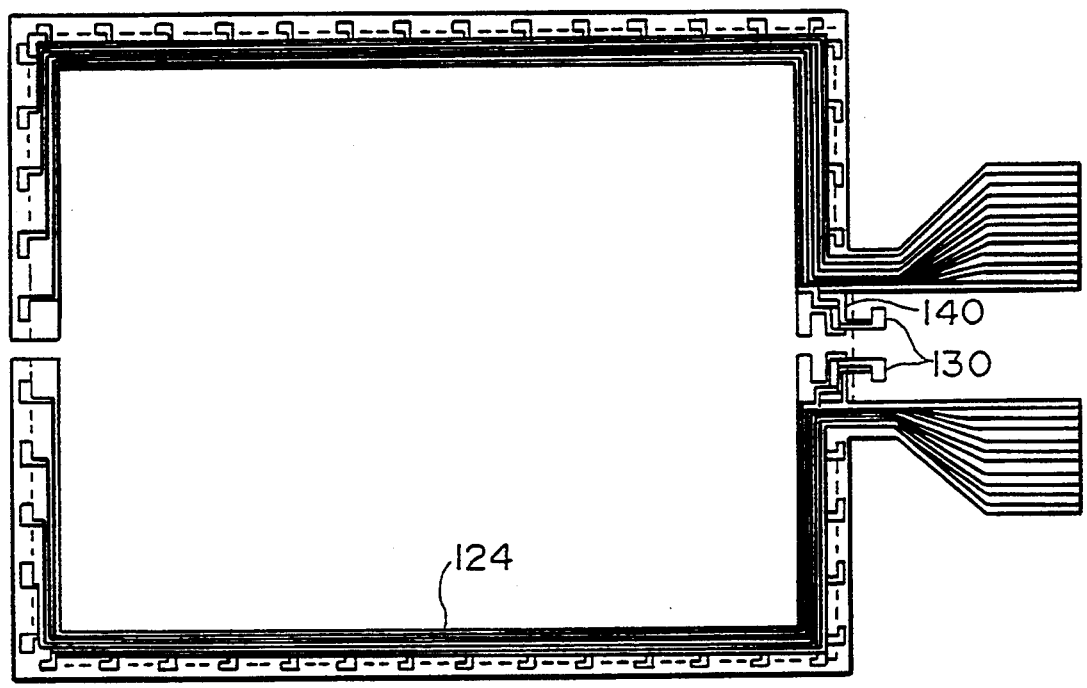
FIG. 34 is a plan view showing an essential part of the touch panel of a fourteenth embodiment of the coordinate input apparatus according to the present invention.

Next, a description will be given of a fourteenth embodiment of the coordinate input apparatus according to the present invention, by referring to FIG. 34. FIG. 34 shows a plan view of the flexible printed circuit used in the fourteenth embodiment.

In this embodiment, a projecting part 130 of the flexible printed circuit 124 is bent along a dotted line 140 and is connected to the conductor layer 8 via the conductive adhesive agent 122. Hence, a wiring pattern for the conductor layer 8 is formed on the flexible printed circuit 124, similarly to the metal wiring lines 112 which are provided with respect to the resistor layer 2.

According to this embodiment, the projecting part 130 is bent, and a part where the electrical connection is made to the conductor layer 8 is formed as a cutout. In other words, the cutout is formed in the flexible printed circuit 124 at the part where the bent (or folded) projecting part 130 is positioned. For this reason, it is possible to realize a uniform thickness of the flexible printed circuit 124 at the electrically connecting part, thereby increasing the stability of the electrical contact.

Figure 35:
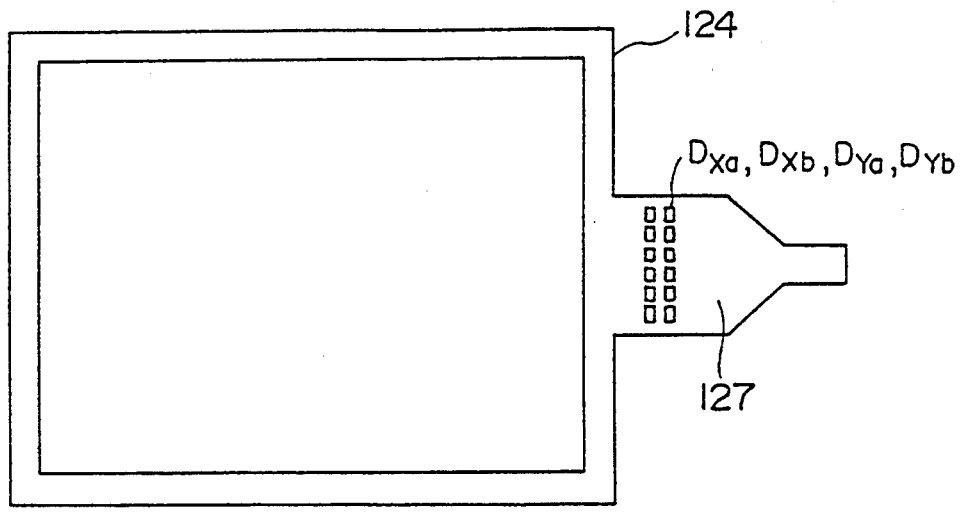
FIG. 35 is a plan view showing an essential part of the touch panel of a fifteenth embodiment of the coordinate input apparatus according to the present invention.

Next, a description will be given of a fifteenth embodiment of the coordinate input apparatus according to the present invention, by referring to FIG. 35. FIG. 35 shows a plan view of the flexible printed circuit used in the fifteenth embodiment.

In this embodiment, the switching elements, that is, the diodes $D_{Xa}$, $D_{Xb}$, $D_{Ya}$ and $D_{Yb}$, are provided on the draw-out part 127 of the flexible printed circuit 124.

According to this embodiment, it is possible to effectively reduce the size of the peripheral part of the touch panel.

Figure 36:
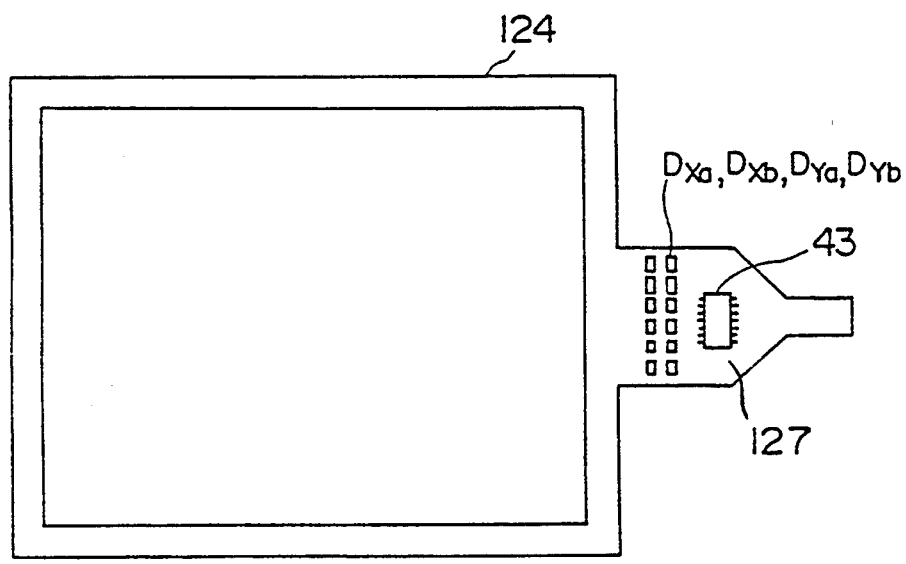
FIG. 36 is a plan view showing an essential part of the touch panel of a sixteenth embodiment of the coordinate input apparatus according to the present invention.

Next, a description will be given of a sixteenth embodiment of the coordinate input apparatus according to the present invention, by referring to FIG. 36. FIG. 36 shows a plan view of the flexible printed circuit used in the sixteenth embodiment.

In this embodiment, the diodes $D_{Xa}$, $D_{Xb}$, $D_{Ya}$ and $D_{Yb}$ and the EEPROM 43 are provided on the draw-out part 127 of the flexible printed circuit 124.

According to this embodiment, it is possible to effectively reduce the size of the peripheral part of the touch panel.

According to the thirteenth through sixteenth embodiments described above, the touch panel can be made by simply connecting two conductor layers, that is, the conductor layer 8 and the resistor layer 2, via the flexible printed circuit 124 which acts as an insulator layer for isolating the two layers 8 and 2 at the peripheral part of the touch panel 41. For this reason, it is possible to eliminate the process of etching the conductor layer or printing an insulator layer in order to isolate the two layers 8 and 2 at the peripheral part of the touch panel 41. As a result, it is possible to reduce both the production process and the production cost of the touch panel 41. Furthermore, the degree of freedom of design of the touch panel 41 is greatly improved.

Of course, the design of the touch panel, that is, the input area of the touch panel, is not limited to the single rectangular area of the above described embodiment. For example, in each of the thirteenth through sixteenth embodiment, the input areas of the touch panel may have a matrix arrangement.

Figure 37:
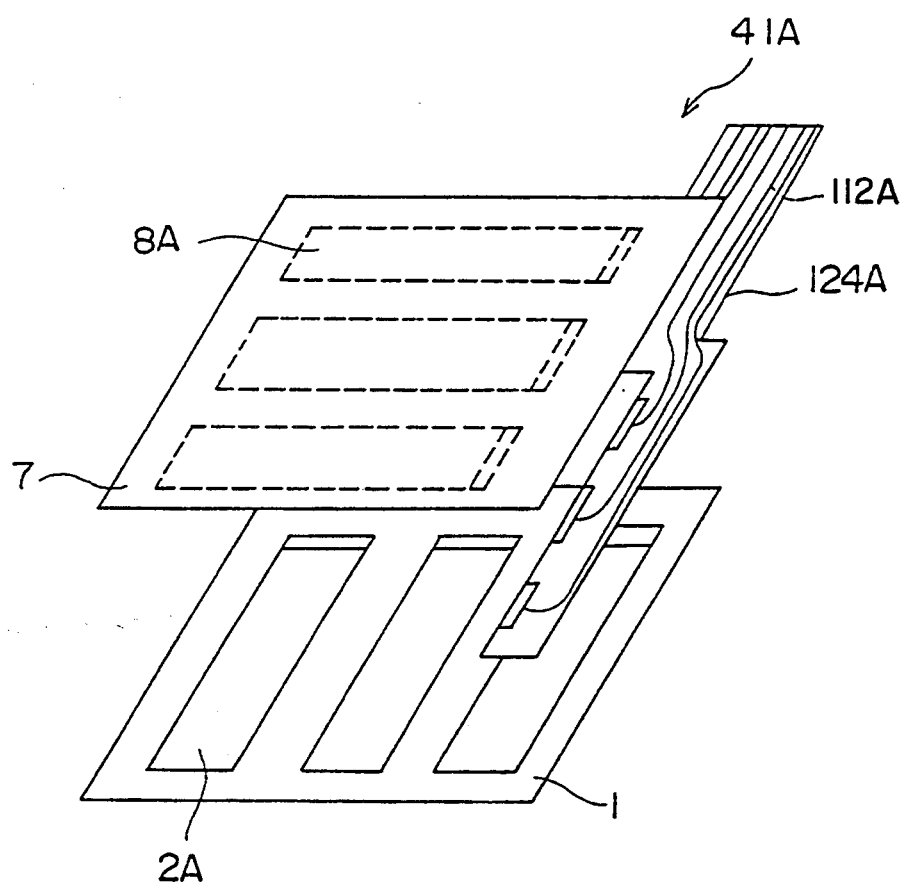
FIG. 37 is a plan view showing an essential part of the touch panel of a seventeenth embodiment of the coordinate input apparatus according to the present invention.

Next, a description will be given of a seventeenth embodiment of the coordinate input apparatus according to the present invention, by referring to FIG. 37. FIG. 37 shows a touch panel 41A used in the seventeenth embodiment. In this embodiment, the input area of the touch panel 41A has the matrix arrangement.

In FIG. 37, a resistor layer 2A is formed on the glass substrate 1 in a plurality of columns. On the other hand, a conductor layer 8A is provided in a plurality of rows which run perpendicularly to the columns under the PET sheet 7. Wiring lines 112A are formed on a flexible printed circuit 124A. The resistor layer 2A and the conductor layer 8A are connected via the flexible printed circuit 124A.

According to this embodiment, it is also possible to effectively reduce the size of the peripheral part of the touch panel 41A.

Further, the present invention is not limited to these embodiments, but various variations and modifications may be made without departing from the scope of the present invention.

What is claimed is:

1. A touch panel for detecting a coordinate of an arbitrary position where pressure is applied, said touch panel comprising:
 a substrate;
 a resistor layer provided on said substrate, the resistor layer having an inner portion and a peripheral part surrounding the inner portion along a periphery of the resistor layer;
 a spacer layer made of an insulator material;
 a conductor layer confronting said resistor layer via said spacer layer;
 a plurality of point electrodes provided on said resistor layer at the peripheral part of said resistor layer along each side of said resistor layer; and
 a plurality of switching elements provided above said substrate and electrically coupled to, and respectively corresponding to, said point electrodes for applying a voltage to said point electrodes, each switching element being positioned between the respective, corresponding point electrode and the inner portion of the resistor layer, said spacer layer comprising a plurality of spacer pieces which are arranged so that an electrical contact is made between said conductor layer and said resistor layer when pressure is applied at an arbitrary position on said conductor layer.

2. The touch panel as claimed in claim 1, which further comprises:
 wiring lines provided on said substrate on an outer side of said resistor layer,
 said switching elements being provided on said substrate by being electrically connected to said wiring lines.

3. The touch panel as claimed in claim 2, wherein said switching elements are transistors.

4. The touch panel as claimed in claim 2, wherein said switching elements are diodes.

5. The touch panel as claimed in claim 1, which further comprises:
 a protecting layer provided on said conductor layer; and
 wiring lines provided on said protecting layer at a position corresponding to the peripheral part of said resistor layer, said switching elements being provided on said protecting layer by being electrically connected to said wiring lines, said point electrodes being provided generally on an outer side of said switching elements relative to the inner portion of said resistor layer.

6. The touch panel as claimed in claim 5, which further comprises:
 electrically connecting means for electrically connecting said wiring lines to said point electrodes.

7. The touch panel as claimed in claim 6, wherein said electrically connecting means comprises a flexible printed circuit.

8. The touch panel as claimed in claim 5, wherein said switching elements are transistors.

9. The touch panel as claimed in claim 5, wherein said switching elements are diodes.

10. The touch panel as claimed in claim 5, wherein the position where said switching elements are provided on said protecting layer substantially corresponds to a region of said resistor layer where equipotential lines are distorted when a voltage is applied to the point electrodes.

11. The touch panel as claimed in claim 1, which further comprises:
 a protecting layer provided on said conductor layer; and
 at least one wiring line provided on said protecting sheet at a position corresponding to the peripheral part of said resistor layer, said switching elements being electrically connected across said at least one wiring line and said point electrodes.

12. The touch panel as claimed in claim 11, wherein said switching elements are transistors.

13. The touch panel as claimed in claim 11, wherein said switching elements are diodes.

14. The touch panel as claimed in claim 1, which further comprises:
 an insulator layer provided on said resistor layer at the peripheral part of said resistor layer and between said point electrodes and the inner portion of the resistor layer; and
 wiring lines provided on said insulator layer, said switching elements being electrically connected across said wiring lines and said point electrodes, said point electrodes being provided generally on an outer side of said switching elements relative to the inner portion of said resistor layer.

15. The touch panel as claimed in claim 14, which further comprises:
 a conductive adhesive agent for adhering said conductor layer to said insulator layer via said wiring lines so as to sandwich said spacer layer between said conductor layer and said resistor layer.

16. The touch panel as claimed in claim 14, wherein said switching elements are diodes.

17. The touch panel as claimed in claim 1, which further comprises:
 a flexible printed circuit provided on said resistor layer at the peripheral part of said resistor layer and between said point electrodes and the inner portion of the resistor layer, said flexible printed circuit including wiring lines printed thereon, said switching elements being electrically connected across said wiring lines and said point electrodes and said point electrodes being provided generally on an outer side of said switching elements relative to the inner portion of said resistor layer.

18. The touch panel as claimed in claim 17, which further comprises:
 a conductive adhesive agent for adhering said conductor layer to said flexible printed circuit via said wiring lines so as to sandwich said spacer layer between said conductor layer and said resistor layer.

19. The touch panel as claimed in claim 17, wherein said switching elements are diodes.

20. The touch panel as claimed in claim 1, which further comprises:
 a protecting layer provided on said conductor layer, wherein an input pressure P applied on said protecting layer to achieve the electrical contact between said conductor layer and said resistor layer and parameters L, H and $\alpha$ related to said spacer layer satisfy a relationship $$0.04 \leq H/(P \times L^4 \times a) \leq 0.8$$

where L denotes a pitch with which the spacer pieces are arranged, H denotes a thickness of said spacer layer, and a denotes a ratio of an area occupied by the spacer pieces on said resistor layer with respect to an area of said resistor layer.

21. The touch panel as claimed in claim 20, wherein said protecting layer is made up of a single flexible sheet, and the input pressure P and the parameters L, H and $\alpha$ satisfy a relationship $$0.04 \leq H/(P \times L^4 \times a) \leq 0.3.$$

22. The touch panel as claimed in claim 20, wherein said protecting layer is made up of two confronting flexible sheets which sandwich an intermediate layer, and the input pressure P and the parameters L, H and a satisfy a relationship
$$0.3 \leq H/(P \times L^4 \times a) \leq 0.8.$$

23. The touch panel as claimed in claim 1, which further comprises:
   a flexible printed circuit having an approximate frame shape such that an opening is formed at a central part, said flexible printed circuit having a top surface and a bottom surface which is printed with wiring lines, said flexible printed circuit being interposed between said conductor layer and said resistor layer so that the wiring lines electrically connect to said point electrodes.

24. The touch panel as claimed in claim 23, wherein the opening of said flexible printed circuit substantially corresponds to an effective input region of the touch panel in which a pressure is applied to input a coordinate.

25. The touch panel as claimed in claim 23, which further comprises:
   an insulator layer isolating said wiring lines on said flexible printed circuit.

26. The touch panel as claimed in claim 23, which further comprises:
   a conductive adhesive agent bonding said wiring lines and said point electrodes; and
   an adhesive agent bonding said insulator layer to said resistor layer.

27. The touch panel as claimed in claim 23, wherein said flexible printed circuit includes a bent part having a wiring line which electrically connects to said conductor layer.

28. The touch panel as claimed in claim 23, which further comprises:
   a memory provided on said flexible printed circuit, said memory storing correction parameters for correcting a non-linear characteristic between an actually input coordinate and a detected coordinate.

29. The touch panel as claimed in claim 23, wherein said flexible printed circuit has a draw-out part which extends outwards from one side of the approximate frame shape, said wiring lines having portions running along said draw-out part.

30. The touch panel as claimed in claim 29, which further comprises:
   a memory provided on the draw-out part of said flexible printed circuit, said memory storing correction parameters for correcting a non-linear characteristic between an actually input coordinate and a detected coordinate.

31. A coordinate input apparatus comprising:
   a substrate;
   a resistor layer provided on said substrate;
   a spacer layer made of an insulator material;
   a conductor layer confronting said resistor layer via said spacer layer;
   a plurality of point electrodes provided on said resistor layer at a peripheral part of said resistor layer along each side of said resistor layer;
   a plurality of switching elements provided above said substrate and electrically coupled to said point electrodes for applying a voltage to said point electrodes;
   contact detection means for detecting the potential of the contact layer and for detecting in an activated state an electrical contact between said conductor layer and said resistor layer when pressure is applied on said conductor layer at an arbitrary position, based on a change in the detected potential of the conductor layer; and
   control means for measuring a coordinate of the arbitrary position by applying a voltage to said point electrodes in a predetermined sequence when said contact detection means detects the electrical contact, said spacer layer comprising a plurality of spacer pieces which are arranged so that the electrical contact is made between said conductor layer and said resistor layer when the pressure is applied at the arbitrary position on said conductor layer.

32. The coordinate input apparatus as claimed in claim 31, wherein said control means first measures a coordinate of the arbitrary position along a first direction which is parallel to one pair of mutually confronting sides of said resistor layer when said contact detection means detects the electrical contact, and thereafter measures a coordinate of the arbitrary position along a second direction which is perpendicular to said first direction by activating said contact detection means when said contact detection means still detects the electrical contact.

33. The coordinate input apparatus as claimed in claim 31, wherein said control means activates said contact detection means after a predetermined time elapses from a time when said contact detection means detects no electrical contact between said conductor layer and said resistor layer.

34. The coordinate input apparatus as claimed in claim 31, wherein said control means includes correction means for correcting a voltage drop introduced at each switching element.

35. The coordinate input apparatus as claimed in claim 31, wherein said control means activates said contact detection means at predetermined intervals, and applies the voltage to said point electrodes in time division depending on whether the point electrodes are arranged in a first direction or a second direction which is perpendicular to the first direction if said contact detection means continues to detect the electrical contact in succession.

36. The coordinate input apparatus as claimed in claim 31, which further comprises:
   a protecting layer provided on said conductor layer.

37. The coordinate input apparatus as claimed in claim 36, which further comprises:
   wiring lines provided on said protecting layer at a position corresponding to the peripheral part of said resistor layer and coupling said switching elements and said control means, said switching elements being provided on said protecting layer by being electrically connected to said wiring lines, said point electrodes being provided generally on an outer side of said switching elements relative to a central part of said resistor layer.

38. The coordinate input apparatus as claimed in claim 31, which further comprises:

a flexible printed circuit having an approximate frame shape such that an opening is formed at a central part, said flexible printed circuit having a top surface and a bottom surface which is printed with wiring lines for coupling said switching elements and said control means, said flexible printed circuit being interposed between said conductor layer and said resistor layer so that the wiring lines electrically connect to said point electrodes.

39. A touch panel adapted for detecting a coordinate of an arbitrary position where pressure is applied, said touch panel comprising:

a substrate;

a resistor layer provided on said substrate;

a spacer layer made of an insulator material and comprising a plurality of spacer pieces;

a conductor layer confronting said resistor layer via said spacer layer, said plurality of spacer pieces of said spacer layer being arranged so that an electrical contact is made between said conductor layer and said resistor layer when pressure is applied at an arbitrary position on said conductor layer;

a plurality of point electrodes provided on said resistor layer at a peripheral part of said resistor layer along each side of said resistor layer;

a plurality of switching elements provided above said substrate and electrically coupled to said point electrodes for applying a voltage to said point electrodes;

a flexible printed circuit provided on said resistor layer at the peripheral part on an inner side of said point electrodes, said flexible printed circuit including wiring lines printer thereon, said switching elements being electrically connected across said wiring lines and said point electrodes, said point electrodes being provided generally on an outer side of said switching elements relative to a central part of said resistor layer.

40. The touch panel as claimed in claim 39, which further comprises:

a conductive adhesive agent for adhering said conductor layer to said flexible printed circuit via said wiring lines so as to sandwich said spacer layer between said conductor layer and said resistor layer.

41. The touch panel as claimed in claim 39, wherein said switching elements are diodes.

42. A touch panel for detecting a coordinate of an arbitrary position where pressure is applied, said touch panel comprising:

a substrate;

a resistor layer provided on said substrate;

a spacer layer made of an insulator material and comprising a plurality of spacer pieces;

a conductor layer confronting said resistor layer via said spacer layer, said plurality of spacer pieces of the spacer layer being arranged so that an electrical contact is made between said conductor layer and said resistor layer when pressure is applied at an arbitrary position on said conductor layer;

a plurality of point electrodes provided on said resistor layer at a peripheral part of said resistor layer along each side of said resistor layer;

a plurality of switching elements provided above said substrate and electrically coupled to said point electrodes for applying a voltage to said point electrodes; and a protecting layer provided on said conductor layer, wherein an input pressure P applied on said protecting layer to achieve the electrical contact between said conductor layer and said resistor layer and parameters L, H and $\alpha$ related to said spacer layer satisfy a relationship $$0.04 \leq H/(P \times L^4 \times \alpha) \leq 0.8$$

where L denotes a pitch with which the spacer pieces are arranged, H denotes a thickness of said spacer layer, and $\alpha$ denotes a ratio of an area occupied by the spacer pieces on said resistor layer with respect to an area of said resistor layer.

43. The touch panel as claimed in claim 42, wherein said protecting layer is made of a single flexible sheet, and the input pressure P and the parameters L, H and $\alpha$ satisfy a relationship $$0.04 \leq H/(P \times L^4 \times \alpha) \leq 0.3.$$

44. The touch panel as claimed in claim 42, wherein said protecting layer is made of two confronting flexible sheets which sandwich an intermediate layer, and the input pressure P and the parameters L, H and $\alpha$ satisfy a relationship $$0.03 \leq H/(P \times L^4 \times \alpha) \leq 0.8.$$

45. A touch panel for detecting a coordinate of an arbitrary position where pressure is applied, said touch panel comprising:

a substrate;

a resistor layer provided on said substrate;

a spacer layer made of an insulator material and comprising a plurality of spacer pieces;

a conductor layer confronting said resistor layer via said spacer layer, said plurality of spacer pieces of the spacer layer being arranged so that an electrical contact is made between said conductor layer and said resistor layer when pressure is applied at an arbitrary position on said conductor layer;

a plurality of point electrodes provided on said resistor layer at a peripheral part of said resistor layer along each side of said resistor layer;

a plurality of switching elements provided above said substrate and electrically coupled to said point electrodes for applying a voltage to said point electrodes; and a flexible printed circuit having an approximate frame shape such that an opening is formed at a central part, said flexible printed circuit having a top surface and a bottom surface which is printed with wiring lines, said flexible printed circuit being interposed between said conductor layer and said resistor layer so that the wiring lines electrically connect to said point electrodes.

46. The touch panel as claimed in claim 45, wherein the opening of said flexible printed circuit substantially corresponds to an effective input region of the touch panel in which pressure is applied to input a coordinate.

47. The touch panel as claimed in claim 45, which further comprises:
an insulator layer isolating said wiring lines on said flexible printed circuit.

48. The touch panel as claimed in claim 45, which further comprises:
a conductive adhesive agent bonding said wiring lines and said point electrodes; and
an adhesive agent bonding said insulator layer to said resistor layer.

49. The touch panel as claimed in claim 45, wherein said flexible printed circuit includes a bent part having a wiring line which electrically connects to said conductor layer.

50. The touch panel as claimed in claim 45, which further comprises:
a memory provided on said flexible printed circuit, said memory storing correction parameters for correcting a non-linear characteristic between an actually input coordinate and a detected coordinate.

51. The touch panel as claimed in claim 45, wherein said flexible printed circuit has a draw-out part which extends outward from one side of the approximate frame shape, said wiring lines having portions running along said draw-out part.

52. The touch panel as claimed in claim 51, which further comprises:
a memory provided on the draw-out part of said flexible printed circuit, said memory storing correction parameters for correcting a non-linear characteristic between an actually input coordinate and a detected coordinate.

53. A coordinate input apparatus comprising:
a substrate;
a resistor layer provided on said substrate;
a spacer layer made of an insulator material and comprising a plurality of spacer pieces;
a conductor layer confronting said resistor layer via said spacer layer, the plurality of spacer pieces of said spacer layer being arranged so that the electrical contact is made between said conductor layer and said resistor layer when pressure is applied at an arbitrary position on said conductor layer;
a plurality of point electrodes provided on said resistor layer at a peripheral part of said resistor layer along each side of said resistor layer;
a plurality of switching elements provided above said substrate and electrically coupled to said point electrodes for applying a voltage to said point electrodes;
contact detection means for detecting in an activated state an electrical contact between said conductor layer and said resistor layer when pressure is applied on said conductor layer at an arbitrary position;
control means for measuring a coordinate of the arbitrary position by applying a voltage to said point electrodes in a predetermined sequence when said contact detection means detects the electrical contact; and
a flexible printed circuit having an approximate frame shape such that an opening is formed at a central part, said flexible printed circuit having a top surface and a bottom surface which is printed with wiring lines for coupling said switching elements and said control means, said flexible printed circuit being interposed between said conductor layer and said resistor layer so that the wiring lines electrically connect to said point electrodes.

* * * * *

UNITED STATES PATENT AND TRADEMARK OFFICE
CERTIFICATE OF CORRECTION

PATENT NO. : 5,451,724
DATED : September 19, 1995
INVENTOR(S) : Fumihiko NAKAZAWA, et al.

It is certified that error appears in the above-indentified patent and that said Letters Patent is hereby corrected as shown below:

Column 4, line 27, delete "FIG. 30 is a diagram" and insert therefor --FIGS. 30(A), 30(B) and 30(C) are diagrams--.
Column 18, line 10, after "damaging", delete "10".
Column 20, line 8, delete "FIG. 30" and insert therefor --FIG. 30(A), FIG. 30(B), and FIG. 30(C)--;
Line 10, after "vicinity", insert --1000--;
Line 13, delete "FIG. 30" and insert therefor --FIG. 30(B)--.
Line 16, after "II", insert --in FIG. 30(C)--.

Signed and Sealed this

Twenty-fifth Day of June, 1996

*Attest:*

BRUCE LEHMAN

*Attesting Officer*   *Commissioner of Patents and Trademarks*